United States Patent
Sterud et al.

(10) Patent No.: US 6,858,083 B2
(45) Date of Patent: Feb. 22, 2005

(54) APPARATUS AND METHOD FOR CLOSED-LOOP CONTROL OF RF GENERATOR FOR WELDING POLYMERIC CATHETER COMPONENTS

(75) Inventors: Michael W. Sterud, Prescott, WI (US); Matthew C. Heidner, Maple Grove, MN (US); Brandon Worcester, Maple Grove, MN (US)

(73) Assignee: SciMed Lifesystems, Inc., Maple Grove, MN (US)

( * ) Notice: Subject to any disclaimer, the term of this patent is extended or adjusted under 35 U.S.C. 154(b) by 301 days.

(21) Appl. No.: 10/163,770

(22) Filed: Jun. 5, 2002

(65) Prior Publication Data

US 2003/0226631 A1 Dec. 11, 2003

(51) Int. Cl.$^7$ ................................................ B32B 31/26
(52) U.S. Cl. ........................ 118/359; 156/378; 156/379; 156/380.1; 156/379.8; 219/633
(58) Field of Search ........................... 156/380.2, 379.8, 156/378, 503, 379, 380.3, 379.6, 359, 380.1; 219/632, 608, 607, 633, 672, 673

(56) References Cited

U.S. PATENT DOCUMENTS

| | | | |
|---|---|---|---|
| 5,051,600 A | * | 9/1991 | Schuetz et al. .......... 250/492.3 |
| 5,306,377 A | | 4/1994 | Jensen et al. ............ 156/304.2 |
| 5,354,323 A | * | 10/1994 | Whitebrook ................ 607/89 |
| 5,374,809 A | * | 12/1994 | Fox et al. .................. 219/633 |
| 5,501,759 A | | 3/1996 | Forman |
| 5,797,878 A | | 8/1998 | Bleam |
| 5,931,812 A | | 8/1999 | Andersen et al. |
| 5,948,345 A | | 9/1999 | Patel et al. |
| 6,254,609 B1 | | 7/2001 | Vrba et al. |
| 6,254,611 B1 | | 7/2001 | Vrba |
| 6,258,099 B1 | | 7/2001 | Mareiro et al. |
| 6,270,504 B1 | | 8/2001 | Lorentzen Cornelius et al. |
| 6,271,507 B2 | * | 8/2001 | Godwin ...................... 219/603 |

FOREIGN PATENT DOCUMENTS

JP  7-16905  1/1995

* cited by examiner

Primary Examiner—Christopher A. Fiorilla
Assistant Examiner—George R. Koch, III
(74) Attorney, Agent, or Firm—Kagan Binder, PLLC

(57) ABSTRACT

For weld bonding polymeric components, a bond monitoring device is utilized to sense emissivity from a bonding site to preferably determine the temperature of the material at the surface of the bonding site, in order to provide feedback information to a current generator that controls the thermal energy that is transferred to the bonding site. The bond monitoring device preferably comprises an infrared detector or pyrometer that determines the temperature at the surface of the bonding site by sensing the infrared radiation, which information is used to control current generation. The current generation device preferably comprises a radio-frequency current generator, which RF current is controllably used to create a magnetic field within a magnetic flux concentrator. When used with an mandrel of magnetically permeable material that is positioned close to the magnetic flux concentrator, the mandrel can generate resistive heat based directly on the supply of RF current. The present invention is particularly applicable to weld bonding of tubular type components, such as may be used to make up a medical catheter lumen, because a heatable mandrel can be inserted within a plurality of components having at least adjacently positioned portions that are to be weld bonded together. By carefully monitoring such a weld bonding site and controlling the current generation and thus the heat created by the mandrel, an effective weld bond can be consistently created even where small polymeric components are weld bonded.

19 Claims, 14 Drawing Sheets

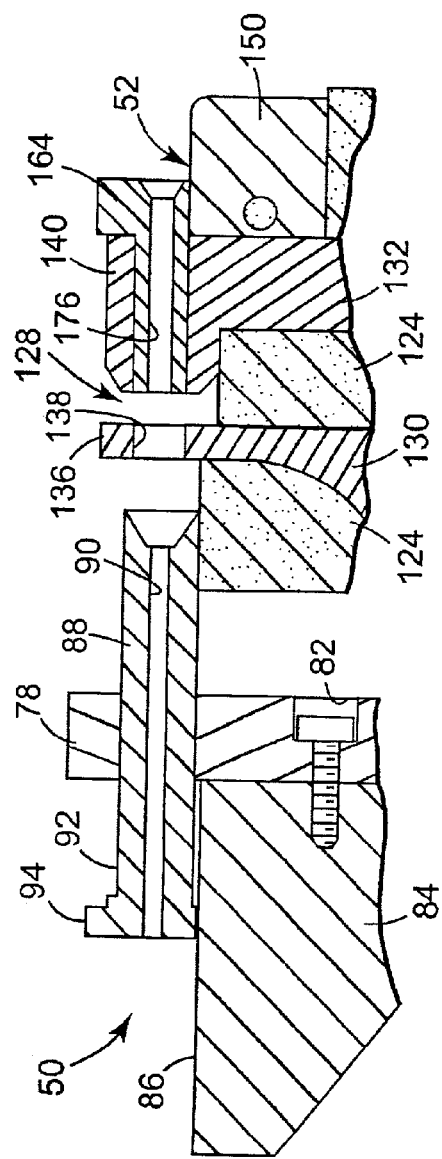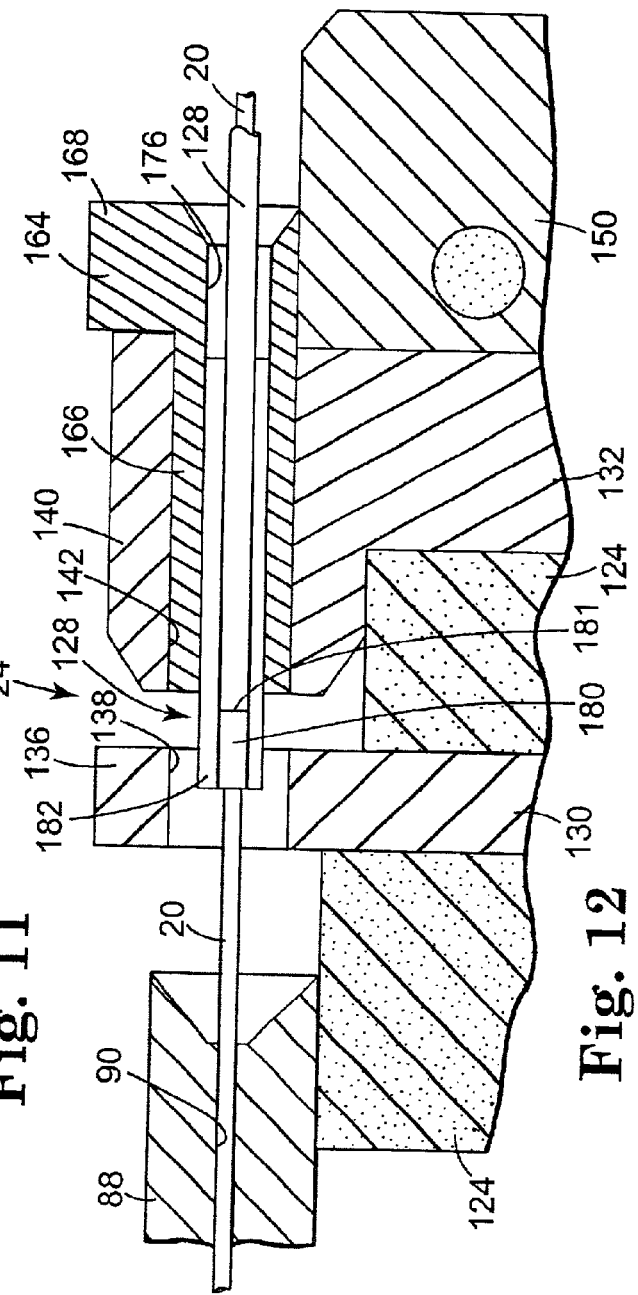

APPARATUS AND METHOD FOR CLOSED-LOOP CONTROL OF RF GENERATOR FOR WELDING POLYMERIC CATHETER COMPONENTS

TECHNICAL FIELD

The present invention relates to the assembly of catheter components, which guide catheters, angioplasty catheters, stent delivery systems and the like are employed in medical procedures, and more particularly to a weld bonding method and apparatus that utilizes RF frequency current generation for creating thermal energy.

BACKGROUND OF THE INVENTION

Many type of catheters have been developed for treating problems and diseases of the body including the vascular, urinary, respiratory, esophageal, gastrointestinal systems and the like, as such body systems include one or more body lumens by which treatment can be facilitated. Such catheters advantageously provide treatment within or beyond any body lumen by generally non-invasive techniques by permitting manipulation of distal features of such catheters at their proximal ends. These features include balloons, such as are usable for percutaneous transluminal angioplasty (PTA) and percutaneous transluminal coronary angioplasty (PTCA), as well as features for delivering medical devices, such as stents and the like. Sometimes, these therapeutic catheterization techniques involve the use of a guide wire that is first controllably inserted within the body followed by sliding a catheter comprising tubing, in the form of one or more lumens, along the guide wire to the appropriate treatment site. Other times, the catheter, whether comprising tubing components or not, is inserted and directed to a treatment site without a guide wire.

For example, a balloon catheter for intravascular treatment is typically delivered along a guide wire. A typical balloon catheter has an elongate shaft with an inner lumen and has a dilatation balloon attached proximate the distal end and a manifold attached proximate the proximal end. These catheters are designed for introduction into a body lumen over the guide wire, which guide wire is slidably received within the inner lumen of the catheter. In use, the balloon catheter is advanced over the guide wire such that the dilatation balloon is positioned adjacent a restriction in a diseased vessel. Then, fluid under pressure is supplied to the balloon through the catheter lumen, expanding the balloon and opening the occlusion in the vessel. Balloon catheter systems are described, for example, within U.S. Pat. Nos. 5,797,878, 5,931,812 and 5,948,345.

For stent delivery, systems have been developed utilizing catheters as part of the stent delivery system. In some applications, balloon catheters may be used to deliver stents where a stent can be delivered to a desired treatment site as a collapsed structure provided about a balloon. At the site, the balloon can be expanded to set the stent in place. One specific example of such a balloon expandable stent delivery system is described in U.S. Pat. No. 6,270,504. Other stents, such as self-expanding stents, may also be delivered by catheter systems. In such a system, a catheter may be used to deliver a self-expanding stent to a treatment site, wherein the stent may be constrained by an outer sheath. Once the stent is properly positioned by manipulating the catheter, the outer sheath can be pulled away, such as by pulling a wire connected to the outer sheath, thereby allowing the self-expanding stent to expand and set in place. Examples of self expanding stent delivery systems are described in U.S. Pat. Nos. 6,254,609, 6,254,611 and 6,258,099.

In order to be properly introduced, delivered and controlled, catheters of all types are designed to accommodate needs for effective insertion within a body lumen and control of the catheter distal end by manipulation of the catheter proximal end. However, given the relatively small size of such medical products and their components, and the significant length that such catheters are to be inserted within a body lumen, it is increasingly difficult to incorporate more functional features and greater controllability to catheter constructions.

Moreover, the assembly of such small components of same or different materials requires difficult bonding techniques that are limited in applicability, not only by their material compatibility limitations, but also by the need to reliably bond components in an effective and medically sanitary way. As such, techniques to provide adhesive and weld bonds between catheter sections or portions or other catheter features, whether of similar or different materials, have been developed. Importantly, however, because of the eventual use of catheters well within body lumens, all such bonds or connections are desirably consistent and complete to ensure reliable usage with minimal body intrusion. In addition, for features such as balloons that require fluid tight sealing for operability, such fluid tight bonding should be of sufficient strength to withstand the fluid pressures involved in balloon dilatation without sacrificing insertability or controllability of the catheter.

SUMMARY OF THE PRESENT INVENTION

The present invention overcomes the disadvantages and shortcomings of the prior art by providing methods and apparatuses for weld bonding polymeric components that utilize a bond monitoring device to sense emissivity from a bonding site to preferably determine the temperature of the material at the surface of the bonding site, in order to provide feedback information to a current generator that controls the thermal energy that is transferred to the bonding site.

In accordance with the present invention, the bond monitoring device preferably comprises an infrared detector or pyrometer that determines the temperature at the surface of the bonding site by sensing the infrared radiation, which information is used to control current generation. An infrared detector is advantageously preferred because infrared radiation is typically emitted in every direction from a hot surface, such as from surfaces of a weld bonding site comprising polymeric materials that are being weld bonded. Also, infrared detectors are capable of accurately reading such emissions even where very little infrared radiation is emitted as a result of the relatively low temperatures used for weld bonding polymeric materials and where relatively small areas are heated. Moreover, infrared detectors do not suffer adverse affects by RF fields.

Also, the current generation device preferably comprises a radio-frequency current generator, which RF current is controllably used to create a magnetic field within a magnetic flux concentrator. When used with a mandrel of magnetically susceptible material that is positioned close to the magnetic flux concentrator, the mandrel can generate resistive heat based directly on the supply of RF current. The present invention is particularly applicable to weld bonding of tubular type components, such as may be used to make up a medical catheter lumen, because a heatable mandrel can be inserted within a plurality of components having at least adjacently positioned portions that are to be weld bonded together. By carefully monitoring such a weld bonding site and controlling the current generation and thus the heat created by the mandrel, an effective weld bond can be consistently created even where small polymeric components are weld bonded.

In one aspect of the present invention, a weld bonding system is provided for creating a weld bond between a first component of polymeric material and one or more others components, wherein the system includes a first guide device for supporting the first component in position for creating a weld bond; a second guide device for supporting a second component in position; a current generator for controllably creating an alternating electrical current through an electrical conductive cable; a magnetic flux concentrator of magnetically permeable material positioned with respect to the electrical conductive cable so that reversing magnetic flux can be created passing within the magnetic flux concentrator by the alternating electrical current through the electrical conductive cable; and a bond monitoring device for detecting a condition of a polymeric component. According to such a system, the first and second guide devices provide for a bonding site so that first and second components, as supported by the first and second guide devices, can be supported to be weld bonded together when positioned within the bonding site. Moreover, the bond monitoring device is provided for creating a signal based upon the detected condition of the polymeric component within the bonding site, and it is connected with the current generation means so that the signal can be transmitted to and received by the current generation means for controllable current generation.

Preferably, a mandrel, wire or the like is used for insertion within a tubular first component of polymeric material so that when a first component is supported by the first guide device, the mandrel can also be at least partially supported thereby with a mandrel portion extending within the bonding site. Such a mandrel provides for wall support and stability of any tubular component or lumen portion during the weld bonding process. Thus, the magnetic flux concentrator may be operatively positioned with respect to the bonding site so that when the mandrel is inserted within a first tubular component, a mandrel portion that is positioned with the bonding site will be affected by reversing magnetic flux when generated with the magnetic flux concentrator to produce surface heating of the mandrel to be transferred to an inside surface of a tubular first polymeric component for at least softening its polymeric material for weld bonding with a second component.

More preferably, the current generator comprises an RF current generation circuit and a feedback circuit by which the signal from the bond monitoring device is utilized for controllable current generation. The bond monitoring device preferably comprises an emissivity detector for sensing a measurable emission from a polymeric material of a component within the bonding site as an indication of temperature of such polymeric material within the bonding site. More preferably, the emissivity detector comprises an infrared detector.

The first and second guide devices advantageously may comprise first and second guide inserts that are removably supported by a first and second guide mount, respectively, so that a plurality of first and second guide inserts with differently sized insert passages can be provided to accommodate different tubular components to be weld bonded.

In accordance with another aspect of the present invention, a method of weld bonding a first tubular polymeric component with a second component includes the steps of supporting the first tubular polymeric component and the second component in position relative to one another so that at least a portion of each of the first and second components are adjacent one another, thereby creating a bonding site for weld bonding the first and second components together; inserting a mandrel at least partially within the first tubular polymeric component; controllably creating thermal energy at a surface of the mandrel and thereby transferring heat to at least an internal surface of the first tubular polymeric component; monitoring the bonding site by a bond monitoring device to determine a condition of the polymeric material of the first component; and sending a signal from the bond monitoring device as feedback information to be used in controllably creating the thermal energy at the mandrel surface.

Preferably, such a weld bonding method further comprises the step of controllably adjusting the creation of thermal energy at the mandrel surface based upon the feedback information. The mandrel may be inserted within the first tubular component before or after the first component is supported in position relative to the second component for creating the bonding site. Moreover, the thermal energy may be controllably created by generating alternating electrical current and conducting the alternating current by a conductive cable to a magnetic flux concentrator and thus creating reversing magnetic flux within the magnetic flux concentrator based upon the alternating current that is generated, and by supporting the first and second components to create the bonding site at a location such that the mandrel, as inserted within at least the first tubular polymeric component, generates thermal energy in response to its exposure to the reversing magnetic flux.

Preferably, the electrical current generated comprises RF current and the bond monitoring device provides its feedback signal to an RF current generator for determining the strength of the RF current to be generated based upon the sensed condition of the polymeric material of the first component. The mandrel may also be inserted within at least a portion of a tubular polymeric second component so that thermal energy can be thermally created within the mandrel to provide heat transfer to internal surfaces of both of the first and second tubular polymeric components for creating a weld bond. Thermal energy may thus be created so that sufficient heat is transferred to the first and second tubular polymeric components for melting at least portions of the first and second tubular polymeric components for at least partial mixing of the respective polymeric materials thereof and creation of a weld bond. In accordance with this aspect of the present invention, the first and second tubular polymeric components may comprise similar or dissimilar polymeric materials.

The bond monitoring device may comprise an emissivity sensor for sensing an emission from the polymeric material within the bonding site as the polymeric material is heated so that it can send a signal to the RF current generator based upon the sensed emission as an indication of temperature of the polymeric material. Preferably, such an emissivity sensor comprises an infrared sensor for sensing infrared emissions from the bonding site.

In accordance with yet another aspect of the present invention, a magnetic flux concentrator of magnetically permeable material for controllably guiding magnetic flux and for use with a current generator having an electrical conductive cable to be positioned relative to the magnetic flux concentrator for creating magnetic flux comprises a first end portion and a second end portion that are arranged with respect to one another to define a gap between respective end surfaces thereof with a passage through the first end portion so that a portion of a component to be weld bonded can be inserted; and a continuous magnetically permeable structure joining the first and second end portions of the magnetic flux concentrator together that defines an internal opening with at least a portion of the magnetically permeable structure to be wrapped by at least one coil of an electrical conductive cable so that electrical current provided through the coil will cause magnetic flux flow within the magnetically permeable structure.

Preferably, the second end portion also comprises a passage through which a portion of a component to be weld bonded can also be inserted. As a preferred design, the magnetically permeable structure comprises first and second leg portions spaced from one another to terminate in the first and second end portions, respectively, the first leg portion preferably being at least partially rounded to accommodate a plurality of coils of an electrical conductive cable to be wrapped about it.

In accordance with yet another aspect of the present invention, a welding mandrel is provided for induction heating based upon exposure thereof within a reversing magnetic flux path, wherein the mandrel comprising 17-4PH stainless steel. Such a mandrel can be provided as part of a system utilizing such a mandrel for creating a weld bond between a first component of polymeric material and at least a second component, wherein the system includes a first guide device and a second guide device for supporting the components in position and to create a bonding site; a current generator for controllably creating an alternating electrical current to an electrical conductive cable; and a magnetic flux concentrator of magnetically permeable material that is operatively positioned with respect to the electrical conductive cable so that reversing magnetic flux can be created passing within the magnetic flux concentrator by the alternating electrical current through the electrical conductive cable. The welding mandrel would thus be provided for induction heating based upon exposure thereof within a reversing magnetic flux path. Such a mandrel could be used within a method for weld bonding a first tubular polymeric component with a second component including the steps of supporting first and second components in position relative to one another for creating a bonding site; inserting a mandrel comprised of 17-4PH stainless steel at least partially within the first tubular polymeric component; and controllably creating thermal energy at a surface of the mandrel and thereby transferring heat to at least an internal surface of the first tubular polymeric component.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows:

FIG. 11 is a cross-sectional view of the first and second guide devices as positioned relative to one another for creating a bonding site in accordance with the present invention for catheter tube components;

FIG. 12 is a cross-sectional view of the first and second guide devices as positioned in FIG. 11 and further illustrating plural catheter tube components positioned on a mandrel and partially within a bonding site in accordance with the present invention;

DETAILED DESCRIPTION OF THE PREFERRED EMBODIMENTS

Figure 1:
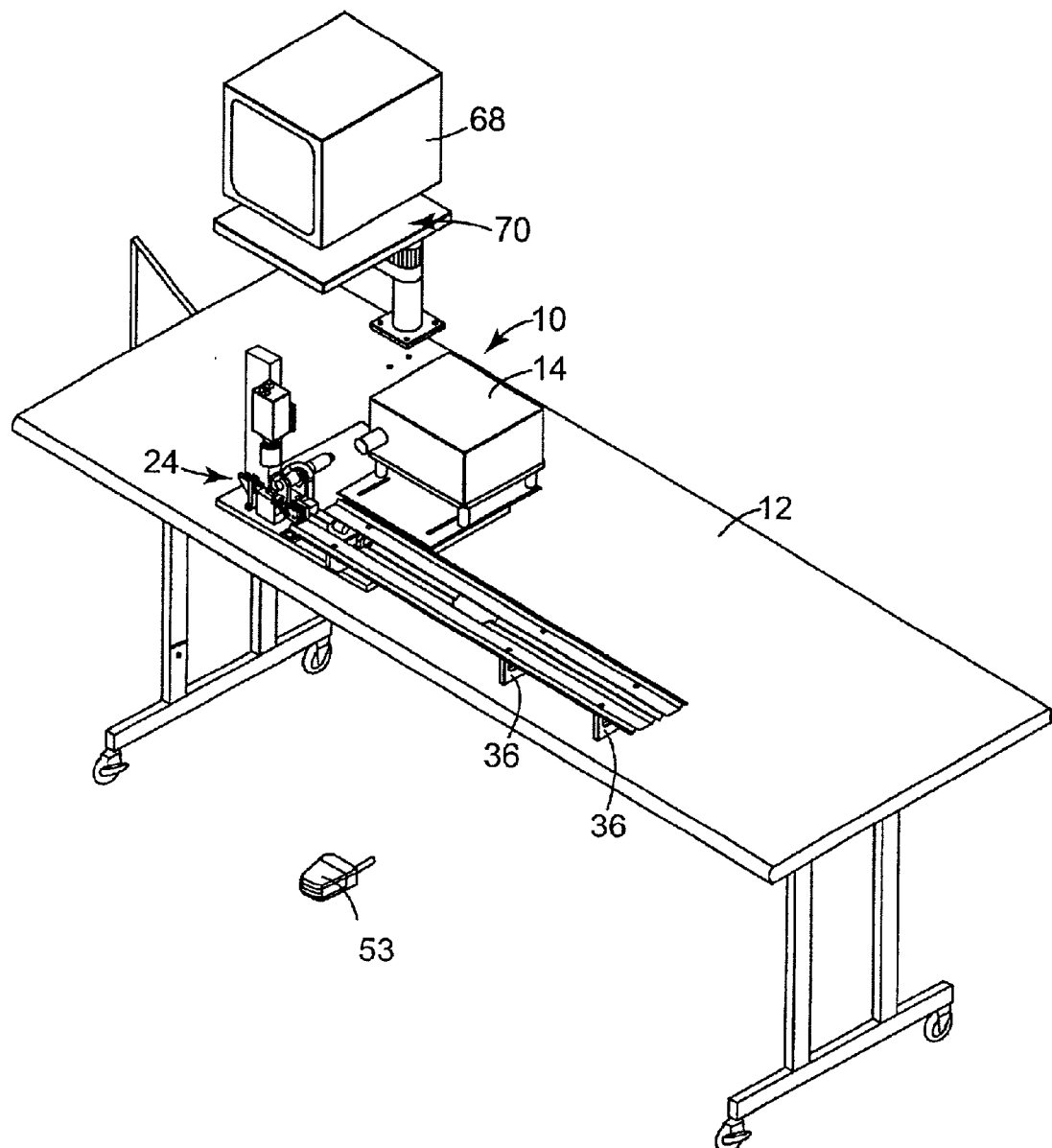
FIG. 1 is a perspective view of an embodiment of an RF welding system in accordance with the present invention shown supported and including monitoring and guiding devices for assembling catheter tube components.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to methods and apparatuses for effectively bonding components of polymeric materials together, and in particular for bonding components of medical devices, such as catheters. Such methods and apparatuses in accordance with the present invention can advantageously be used even where very small components are to be bonded. In particular, the present invention has been developed for the ability to bond tubular components of polymeric materials together as are usable for making up components of medical catheters of all types. Such catheters, themselves, are known for treating problems and diseases of the body in that they are made for introduction within any number of body passages or lumens, such as are provided within the vascular, urinary, respiratory, esophageal, gastrointestinal systems of the body and the like. Therapeutic catheterization techniques (whether for treatment of a site or diagnostic purposes) may involve the use of a guide wire that is first controllably inserted within the body up to and beyond the treatment site within such body lumen. Thus, in order to follow such a guide wire to a treatment site, catheter lumens have been developed that comprise one or more tubular components that can be slid along the guide wire to the appropriate treatment site. As used throughout this application, a treatment site may comprise a site that is to receive treatment directly or indirectly from a catheter component or any site that is being diagnosed directly or indirectly by a catheter component.

For example, a balloon catheter for intravascular treatment is typically delivered along a guide wire. Balloon catheters are well known, such as are described in U.S. Pat. No. 5,797,878, U.S. Pat. No. 5,931,812 and U.S. Pat. No. 5,948,345, the entire disclosures of which are incorporated herein by reference. A typical balloon catheter has an elongate shaft with an inner tubular lumen and has a dilatation balloon attached proximate the distal end and a manifold attached proximate the proximal end. These catheters are designed for introduction into a body lumen over the guide wire, which guide wire is slidably received within the inner lumen of the catheter. In use, the balloon catheter is advanced over the guide wire such that the dilatation balloon is positioned adjacent a treatment site, such as an occlusion or any obstruction, lesion, or stenosis of a body lumen. Then, fluid under pressure is supplied to the balloon through the catheter lumen, expanding the balloon and thus applying a force to the wall of the body lumen, such as for opening or otherwise treating or diagnosing it.

Catheter systems have also been developed utilizing catheters as part of a stent delivery system. Stents are well known as structural devices that are left within a body lumen as part of a medical procedure conducted upon a treatment site. In some applications, balloon catheters may be used to deliver stents where a stent can be delivered to a desired treatment site as a collapsed structure provided about a balloon. At the site, the balloon is expanded to set the stent in place. One specific example of such a balloon expandable stent delivery system is described in U.S. Pat. No. 6,270,504, the entire disclosure of which is incorporated herein by reference. Self-expanding stents may also be delivered by catheter systems. In one such system, a catheter is used to deliver a self-expanding stent to a treatment site, wherein the stent is constrained by an outer sheath. Once the stent has been properly positioned by manipulating the catheter, the outer sheath is then pulled away from the collapsed stent, such as by pulling a wire connected to the outer sheath, so as to permit the self-expanding stent to expand and set in place. Examples of self expanding stent delivery systems are described in U.S. Pat. Nos. 6,254,609, 6,254,611 and 6,258,099, the entire disclosures of which are incorporated herein by reference.

In order to be properly introduced, delivered and controlled, catheters of all sorts of types are preferably designed to accommodate needs for pushability, trackability, crossability and torque transmission to the distal catheter end as such is applied to the proximal end of the catheter. For purposes of this application, the following terms are given the following meaning. Pushability is the ability to transmit force from the proximal end of the catheter to the distal end of the catheter. A catheter shaft should have adequate strength for pushability and resistance to buckling or kinking. Trackability is the ability to navigate tortuous vasculature or other body lumens. That is, the distal portion of the catheter must track the guidewire through small tortuous vessels or body lumens to reach the area to be treated. A more flexible distal portion is known to improve trackability. Thus, it may be desirable to provide a catheter shaft with elastomeric properties to improve flexibility. Crossability is the ability to navigate the balloon catheter across narrow restrictions or obstructions in the vasculature.

Optimization of pushabillity, trackability, crossability and torque transmission may be accomplished by carefully choosing the catheter material and its physical characteristics, such as wall thickness. Because these catheters are frequently inserted for long distances, it is generally also desirable to minimize the friction between the guide wire and the surface of the catheter lumen by constructing the catheter from a lubricous material such as a high-density polyethylene (HDPE), polytetrafluoroethylene (PTFE) or similar material. Polymeric materials are known for these uses.

In order to achieve a combination of desired properties at different parts of the catheters themselves, catheters have been developed by combining a plurality of tubing components together to define a catheter lumen. That is, a portion of the overall length of a catheter lumen may comprise a different tubing type component than another. These one or more portions may comprise tubing components of different physical characteristics and/or different materials. For example, a tip portion may be provided that is more resilient than the remainder of the catheter lumen for better crossability and to provide a softer leading end of the catheter for abutting body internal membranes and the like. Different materials include different polymeric materials from one another, for example, or similar polymers of different densities, fillers, crosslinking or other characteristics. In particular, a portion of a catheter lumen may comprise a material chosen for flexibility to follow a body lumen's path while another portion may comprise a material chosen for axial and/or torque transmission.

Likewise, other catheter features, such as balloons, are frequently prepared from a variety of polymeric materials depending on their intended use. Generally, materials for balloons, for example, are required to possess elastomeric properties so that the dilatation balloon has the requisite compliance to achieve a predetermined relationship between balloon diameter and dilatation pressure. Moreover, such balloons must be able to resist bursting at the relatively high pressures commonly employed during these procedures. Because commonly used lubricous catheter materials typically do not possess requisite elastomeric properties, the balloons are frequently prepared from a polymeric material that is different from, and is not readily bonded to, the material employed to fabricate the catheter. For, example, balloons are frequently formed from polyethylene terephthalate (PET) as well as nylon.

According to the present invention, a weld bonding technique has been developed to provide weld bonds between catheter sections or portions or other catheter features, whether of similar or different materials that are compatible for welding. As used throughout this application, weld bonding means a bond that results by exposure to sufficient thermal energy to melt at least a portion of the polymeric material of one component and a portion of the polymeric material of a second component so that the polymeric materials can mix sufficiently to create a permanent bond. Moreover, in accordance with the present invention, such bonds are created that are preferably consistent from part to part and that are complete to ensure the performance of reliable catheterization techniques with minimal body intrusion. Also, it is preferable that each bond not adversely create any surface feature or adversely change material properties.

Figure 2:
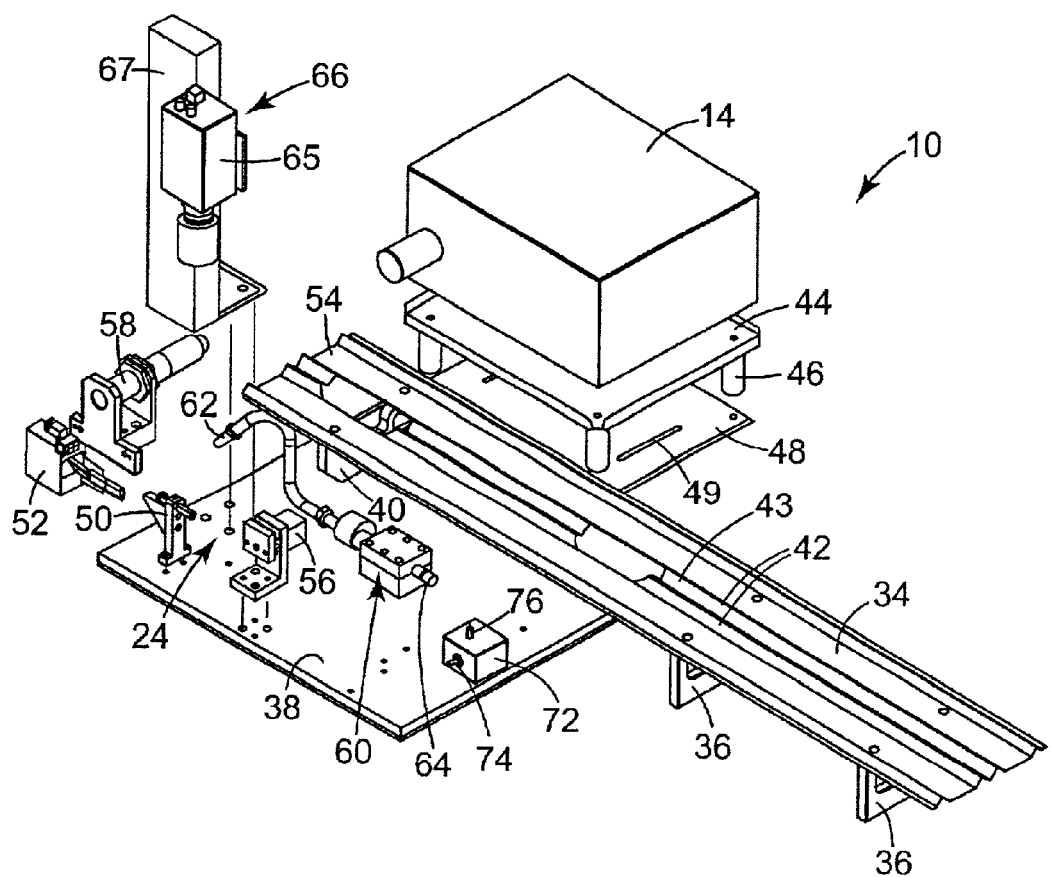
FIG. 2 is an exploded view in perspective of a welder assembly of the system of FIG. 1 including an RF current generator combined with guide and supporting devices for catheter components.

With reference to the accompanying Figs., and initially to FIGS. 1 and 2, a weld bonding system 10 in accordance with the present invention is illustrated that is provided upon a conventional support table 12 for use by an operator for bonding polymeric components. In particular, the weld bonding system 10 that is shown and will be described below can advantageously be used for bonding plural tubular polymeric catheter components together.

Figure 13:
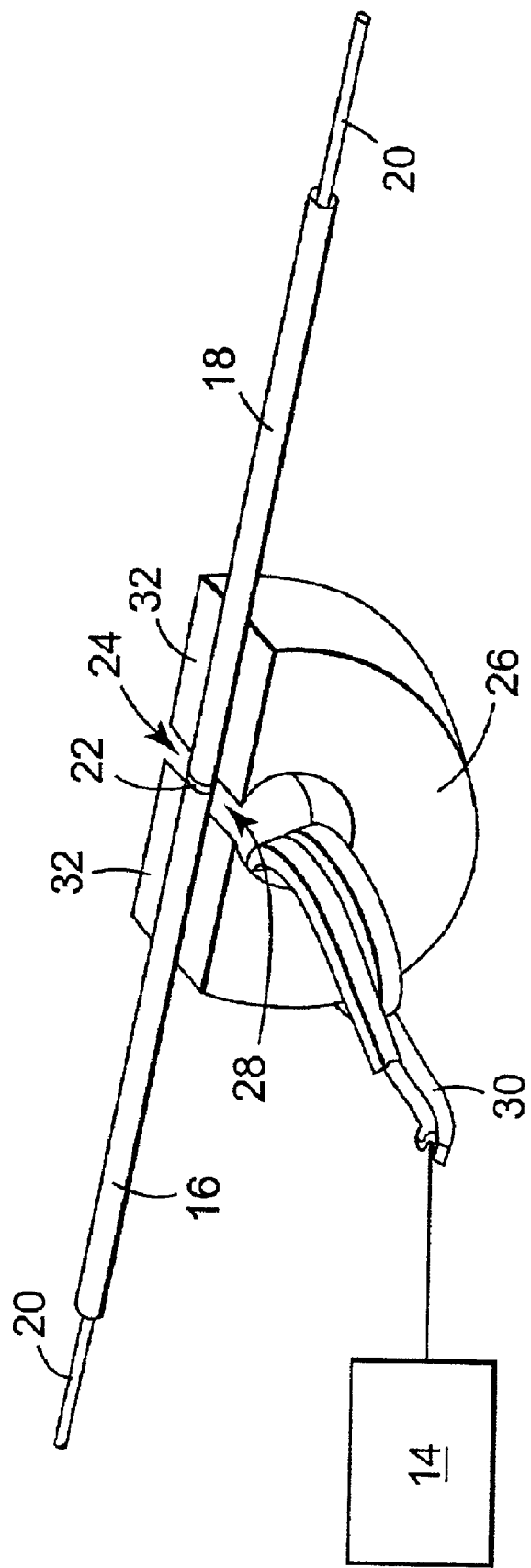
FIG. 13 is a perspective view of another embodiment of a magnetic flux concentrator in accordance with the present invention.

In a weld bonding system 10 according to the present invention, a radio-frequency ("RF") current generator 14 is utilized, which will be described in greater detail below, the purpose of which is to controllably create the thermal energy that is needed to weld polymeric components together. As illustrated in FIG. 13, a first tubular catheter component 16 is positioned with respect to a second tubular catheter component 18 to be bonded together at facing ends thereof, thus creating a butt weld. It is understood that the present invention may be utilized to create other weld techniques, such as lap welds and any other known or developed welding technique whereby components are located with at least portions thereof adjacent one another. As illustrated, the first and second catheter components 16 and 18, respectively, are supported on a mandrel 20 that is slidably inserted within internal passages that extend through the first and second components 16 and 18, the mandrel 20 being inserted at least within both of the first and second components 16 and 18 some distance from a joint 22 created by the facing ends thereof.

The mandrel 20 comprises a material that as a result of exposure to magnetic flux generates induction heating at its surface, which heat may, at a sufficient level, be the thermal energy that is transferred to the first and second catheter components 16 and 18 to create a weld bond at the joint 22. In particular, the mandrel 20 may comprise any metal that is magnetically susceptible and that possesses some resistance to electrical current. Preferably, stainless steel is used for the mandrel 20, such as any 300 series stainless steel, including, in particular 304V stainless steel. Alternatively, 17-4PH stainless steel has been found to be a preferred stainless steel that is more effective in generating surface heat by induction heating and that is usable for a weld bonding process in accordance with the present invention. The use of 17-4PH stainless steel in making the mandrel material has been discovered to be an improvement over other materials because it has been found to heat more efficiently with greater consistency for a longer life. In particular, the 17-4PH stainless steel has been found to generate more heat at lower flux levels and to heat faster and more evenly with greater consistency in repeatablilty over successive uses. In any case, induction heating of the mandrel occurs because of electrical current that is generated as eddy currents within such magnetically susceptible material (in the form of a mandrel) by positioning the mandrel within the flux line pattern of a polarity reversing or magnitude changing magnetic field over a time period. The rate of change in polarity or magnitude over time induces such eddy currents that, in turn, create heat based on resistivity. The use of RF current is particularly advantageous because of its high frequency of reversing polarity, which frequency of reversing polarity increases frictional heat generated by such shifting polarization and thus relates directly to the induction of heat within the mandrel. Moreover, for smaller parts, such as a mandrel used for bonding catheter components, higher frequencies have been found to heat more effectively.

Thus, in order to create a controlled magnetic field acting specifically on the mandrel 20 at the bonding site 24, a magnetic flux concentrator 26 is provided within which magnetic flux can be controlled to direct sufficient magnetic flux into the mandrel 20. To do this, the magnetic flux concentrator 26 preferably comprises a strong magnetically permeable material within which a magnet flux can travel. The magnetic flux concentrator 26 is also connected to an electrical cable 30 that is coiled in position about a portion of the magnetic flux concentrator 26 so as to create a magnetic flux flow path through the magnetic flux concentrator 26. As noted above and described in greater detail below, the cable 30 is preferably connected to the RF Generator 14. Suitable materials for the magnetic flux concentrator 26 include, without limitation, iron containing materials and alloys, ferromagnetic and ferromagnetic acting materials, and ferrites, of which Manganese-Zinc materials are preferred. As one particular example, the N-27 base material that is commercially available from Dexter Magnetics of Chicago, Ill. and that contains Manganese and Zinc is suitable. The cable 30 may comprise any electrically conductible wire material, and preferably comprises a solid conductor, a twisted or braided strand conductor or the like of large enough gauge in order to prevent significant resistance heating of the cable. As an example, a copper strand braided cable of six gauge is suitable in order to assure sufficient RF current transfer to create a desirable magnetic field for weld bonding catheter components as described herein.

The magnetic flux concentrator 26 also preferably provides a gap 28 that permits the mandrel 20 to, in effect, complete a magnetic flux circuit primarily defined by the magnetic flux concentrator 26. When magnetic flux is generated within the magnetic flux concentrator 26 by alternating RF current passing within the coils of the electrical cable 30, the magnetic flux also alternates in its polarity through the portion of the mandrel 20 within the bonding site 24. As above, the reversing polarity magnetic flux creates electrical current and hysterisis loss for inducing heat within the mandrel 20, which heat is transferred to the first and second catheter components 16 and 18 for making a weld bond. The size of the gap 28 can be determined for specific applications empirically or based upon magnetic field modeling taking into account the mandrel 20, the shape of the magnetic flux concentrator 26, the position and spacing of the mandrel 20 from the magnetic flux a concentrator 26, and the materials and dimensions of the mandrel 20 and the magnetic flux concentrator 26. As shown, the magnetic flux concentrator 26 preferably also includes flats 32 that not only provide support surfaces for the first and second catheter components 16 and 18, but also assist in creating an efficient system wherein sufficient heat can be generated to form a weld bond. With such a magnetic flux concentrator 26, as illustrated, flux is more concentrated to one side of the mandrel 20, which is sufficient for weld bonding operations on smaller components. As the components increase in size, it may become more important to control flux around more of the mandrel 20, such as by partially surrounding or completely surrounding the mandrel 20 with material of the magnetic flux concentrator, an example of which is illustrated at 126 in FIG. 9 and described below. Where the magnetic flux concentrator surrounds the mandrel, as at 126 in FIG. 9, flux is better concentrated to affect the mandrel from 360 degrees.

Preferably, the heating effect is most strongly controlled by the system design at the portion of the manifold 20 just adjacent to the joint 22 so that the weld bond is created from the joint 22 toward the other ends of the first and second catheter components 16 and 18. That is, it is preferable to control the weld bond formation from the joint 22 inward so that the effectiveness of the weld bond can be monitored by watching the progression of molten material away from the joint 22. Referring back to FIGS. 1 and 2, the weld bonding system 10 preferably includes components that are configured to accommodate weld bonding of tubular catheter components, such as discussed above and illustrated as first and second catheter components 16 and 18. As such, a catheter component support tray 34 is operatively supported from the support table 12 by spacers 36 and from a mounting plate 38 by an additional spacer 40. For bonding at least one elongate catheter component, the tray 34 itself preferably is elongated to accommodate the length of a catheter component, and in particular, preferably comprises ridges 42 that define a guide channel 43 within which a catheter component can be axially laid and along which the catheter component can be slid toward and away from a bonding site 24 (as noted above and described in greater detail below). The RF generator 14 is also illustrated supported from the mounting plate 38 by a support tray 44 that is elevated by spacers 46 from a sub plate 48. The sub plate 48 is preferably adjustably mounted to the mounting plate 38 by conventional means including adjustment slots 49 that permit the sub plate 48 to be slidably movable relative to the mounting plate 38.

Also for accommodating tubular like catheter components, a first guide device 50 and a second guide device 52 are also mounted to the mounting plate 38, both of which are positioned spaced from the end 54 of the catheter support tray 34 adjacent the bonding site 24. The bonding site 24 is preferably defined between the first and second guide devices 50 and 52, respectively, so the second guide device 52 is preferably mounted to the mounting plate 38 in between but closer to the end 54 of the catheter component support tray 34 than the first guide device 50. A clamp mechanism 56 is also preferably mounted to the mounting plate 38 in between but closer to the end 54 of the catheter component support tray 34 than the second guide device 52. As such, it can be seen that the catheter component support tray 34, the clamp mechanism 56, the second guide device 52 and the first guide device 50 are arranged substantially in line with one another so as to together support and guide elongated tubular like catheter components for bonding. Preferable specifics of the clamp mechanism 56, the first guide device 50 and the second guide device 52 will be described in greater detail below. The clamp mechanism 56 is preferably controllable to activate its clamping function by a foot pedal 53, illustrated in FIG. 1, that can be conventionally used to control the clamp, such as may activated by a pneumatic cylinder of the clamp mechanism 56, described below. Circuitry of any pneumatic control system can be provided in accordance with well known techniques.

Also positioned and mounted to the mounting plate 38 is a bond monitoring device 58, the purpose of which, in accordance with one aspect of the present invention, is to detect the condition or characteristics of polymeric components within the bond site 24 to provide feedback information to the RF generator 14 to control its current output. Preferably, the bond monitoring device 58 detects any measurable emission from the bond site 24 during the bonding process that correlates to or is indicative of the temperature of the bond site. That is, it is preferable to sense the temperature of the bond site directly where the polymeric components are affected as opposed to the temperature of a heat generating component, such as mandrel 20 described above, or material of the polymeric components adjacent to and outside of the bond site. A non-contact sensor is preferred as the bond monitoring device 58, but it is contemplated that a contact sensor, such as a thermocouple or other direct temperature sensor could be used.

In accordance with a preferred aspect of the present invention, the bond site temperature can be determined based on a detected emissivity from the bond site 24 where the polymeric components at the bond site 24 are softened or molten. Most preferably, the bond monitoring device 58 comprises an infrared detector or pyrometer that senses the spectral emissivity that emmanates from the bond site 24 during the weld bonding process. Infrared detectors are preferred also in that they are not affected by the magnetic flux field that is generated as described above. Any infrared detector is suitable for use in accordance with the present invention, but it is preferable that an infrared detector be selected that is sensitive to infrared readings as they are emmanated from polymeric materials at around their melting temperatures. For any different weld bonding of polymeric materials, the spectral emissivity could be different. One specific detector that is usable in accordance with the present invention is the model KT12.M6 pyrometer made by Heitronics Company of Wiesbaden, Germany, and commercially available from Wintronics Inc. of Millington, N.J. Any such pyrometer may include appropriate filters and signal amplifying circuitry for determining the sensed infrared values from the bonding site 24. This determined information can be correlated with the bonding site temperature as described below.

The wavelength range that the infrared detector detects is preferably matched to the temperature to be measured. For example in most catheter polymer welding applications the temperature range that is of interest is from about 150° C. to 300° C. (400°–600° K).

Planck's Law describes the relationship between the infrared radiation emitted from an ideal blackbody across the infrared spectrum for a constant known temperature. The relationship results in the generation of a family of curves for various temperatures showing the value of electromagnetic radiated flux for wavelength values in the 0.1 to 100 micron region.

Using Planck's Law and the known generated family of curves as a starting point, and assuming the ideal blackbody of Planck's Law is an ideal (100%) emitter, the emissivity of other surfaces, such as common polymer materials, are expressed as a ratio of their emitted infrared flux to the infrared flux emitted by an ideal blackbody as described by Planck's Law at various temperatures.

For better discrimination between temperatures, the infrared radiation to be detected is chosen from the side of the emission curves where there is a greater slope in the curve. Also, to avoid additional infrared noise from room temperature objects the wavelength range chosen should be less than about 4 $\mu$. For welding polymer catheters components, the preferred wavelength range to detect is therefore from approximately 2 $\mu$ to 4 $\mu$.

A preferred detector to use is a HgCdTe detector (MCT) with a cutoff wavelength of 3.7 $\mu$. This detector material typically operates at temperatures between 200 degrees Kelvin down to cryogenic temperatures of 77 Kelvin or lower. Cooling may be employed to reduce the thermal noise of the detector if the detector itself would be close to the same temperature as the material to be sensed. The principle of operation of a pyrometer is based on Planck's Law of radiation. Traditional pyrometers are one and two-color pyrometers, multi-color and multi-wavelength pyrometers. One-color temperature pyrometers require knowing the emissivity of the target surface at the recording wavelength. Two-color pyrometers assume that the emissivity is the same at the two wavelengths or the ratio of the emissivity of the two wavelengths is known. Multi-color pyrometers measure radiation at several wavelengths and measure temperature by solving an algebraic equation. Multi-wavelength pyrometers measure the temperature by curve fitting the experimental data to a mathematical relation containing one unknown constant.

The infrared detector system may also include an infrared radiation collector to enhance its performance. Such a collector may comprise a lens, fiber-optic bundle, parabolic mirror, or other such optical device that gathers infrared emissions from an area larger than the emanating area and then projects such infrared radiation to an infrared detector such as the infrared detector described below. Moreover, parabolic or elliptic mirrors are able to capture radiation regardless of the emission angle of infrared radiation emanating from the weld bonding surfaces whereas a lens gathers radiation from only where the lens is directed.

An infrared collector is advantageously preferred because infrared radiation is typically emitted in every direction from a hot surface, such as from surfaces of a weld bonding site 24 comprising polymeric materials being weld bonded. For weld bonding polymeric catheter components, such weld bonding sites may have surface areas that are very small. Also, the temperatures associated with polymeric weld bonding processes are relatively low. As such, the use of an infrared collector is preferred to get an accurate reading even where very little infrared radiation is emitted. That is, for the relatively low temperatures used for weld bonding polymeric materials and the relatively small heated areas, it is preferably to utilize an infrared collector to enhance the signal to noise ratio of the detected infrared radiation. An infrared detector may also be used with an optical chopper and lock-in amplifier in order to improve the signal to noise ratio.

The mounting plate 38 also preferably supports a cooling system 60 having a cooling fluid directing nozzle 62 that preferably can be adjustably directed toward the bonding site 24. A cooling fluid inlet 64 is provided for connection to an external supply of cooling fluid (not shown). The cooling system 60 is preferably provided so that once a weld bond is complete, as sensed by the bond monitoring device 58, the bonding site 24 can be more quickly cooled to set the weld bond so that the bonded polymeric components can be removed from the weld bond system 10 so that a next process can be conducted.

A camera system 66 can also be operatively supported, in a system such as illustrated in FIGS. 1 and 2, to the mounting plate 38 so as to be positionable relative to the bonding site 24 to provide visual inspection of the bonding site 24. The camera system 66 is preferably provided so that an operator can monitor the progression of a weld bond. To do this, it is more preferable that the camera system 66 include appropriate lenses to enlarge the bonding site 24 since the polymeric catheter components are typically rather small for visual monitoring. As shown in FIG. 1, the camera system 66 is preferably operatively connected with a visual output monitor 68, which operative connection can be conducted in any conventional or developed manner. It is also contemplated that the signals from the camera system 66 may be processed in any way through a processor unit or computer for enhancing or otherwise modifying the image that is projected on the monitor 68. As shown, the monitor 68 is supported relative to the support table 12 by a rotatably adjustable support tray 70, as are well-known. The camera system 66, as shown, comprises a camera 65, which preferably comprises a digital camera as are well-known, for viewing the bonding site 24. In order to support the camera 65 at an appropriate location for viewing the bonding site 24, a support structure 67 is shown that positions camera 65 in place. The support structure 67 preferably permits adjustable movement of the camera 65 in at least it's X and Y directions so that the camera 65 can be precisely positioned over the bonding site 24 as desired. Such supporting mechanisms that permit this adjustment are well-known and any conventional mechanism can be employed.

Also, an air blow box 72 is illustrated mounted to the mounting plate 38 having a switch 74 for turning on and off an air flow from a nozzle 76. Such an air blow box 72 is preferably provided as a convenient way to blow debris from parts or catheter components by holding them in front of the nozzle 76 before, during or after a bond welding process. The switch 74 and the manner of providing pressurized air supply can be conventional.

It is noted that the various components described above are described and illustrated as mounted to the mounting plate 38 to define their operative positions relative to one another. It is understood that these components may be directly mounted to other support structures, such as the support table 12, or any other support structure for operatively supporting these components in positioned to one another. It is also contemplated that each of the components may be independently supportable by itself or based upon its own construction so that the components may be merely arranged relative to one another without any additional mounting.

Figure 3:
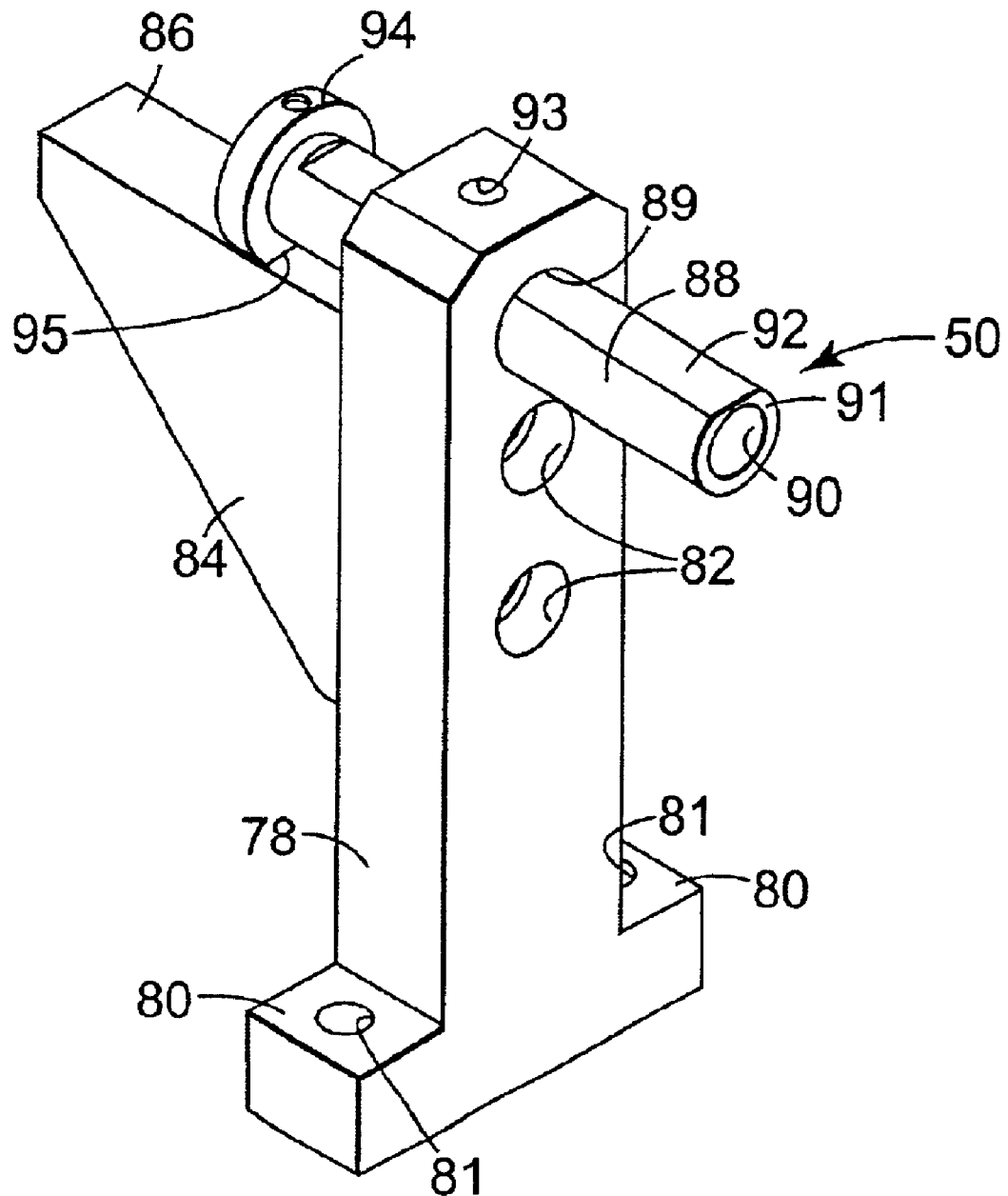
FIG. 3 is a perspective view of a first guide device of the welder assembly of FIG. 2 including a removable first guide insert.

Referring to FIG. 3, the first guide device 50 is illustrated separate from the mounting plate 38 and the remainder of the well bond system 10. Specifically, the illustrated first guide device 50 comprises a guide mount 78 including lower flange portions 80 having openings 81 for mechanical fasteners to secure the mount 78 to the mounting plate 38.

Guide mount 78 also preferably includes openings 82 that permit fasteners to be inserted for securing a gusset portion 84 to a side of the guide mount 78. Thus 84 advantageously provides a guide surface 86 for slidably guiding a first guide insert 88 as it is slidably movable through a passage 89 also provided through the guide mount 78.

The first guide insert 88 is preferably removably retained within the passage 89 so that any number of specifically designed first guide inserts 88 can be interchanged with one another. As shown, each first guide insert 88 defines an internal passage 90 that is of a specific size to accommodate a specific need of a particular support application. As discussed in greater detail below, the passage 90 may be defined by the size of the mandrel 20, the size of a catheter component that may be supported thereby, or additional constraining devices that may be utilized as part of the weld bonding process. In any case, it is preferable that the guide mount 78 permit any number of first guide inserts 88 to be interchanged with one another, which first guide inserts 88 can be individually tailored for specific applications. More preferably, each first guide insert 88 is provided with an axial surface 92 leading from a first edge 91 of the first guide insert 88 almost entirely to a head portion 94 of the first guide insert 88 that is larger than the passage 89 to restrict movement of the first guide insert 88 entirely through passage 89. The axial surface 92 is preferably flat so that a set screw (not shown) can be provided through threaded passage 93 from the top of the guide mount 78 for securing the first that insert 88 in a selected axial position relative to the guide mount 78. The head portion 94 also preferably includes a flat portion 95 facing an opposite direction as the flat axial surface 92 for sliding engagement with the guide surface 86 of the gusset 84. As such, it is clear that any first guide insert 88 can be accurately and adjustably positioned relative to the guide mount 78.

Figure 4:
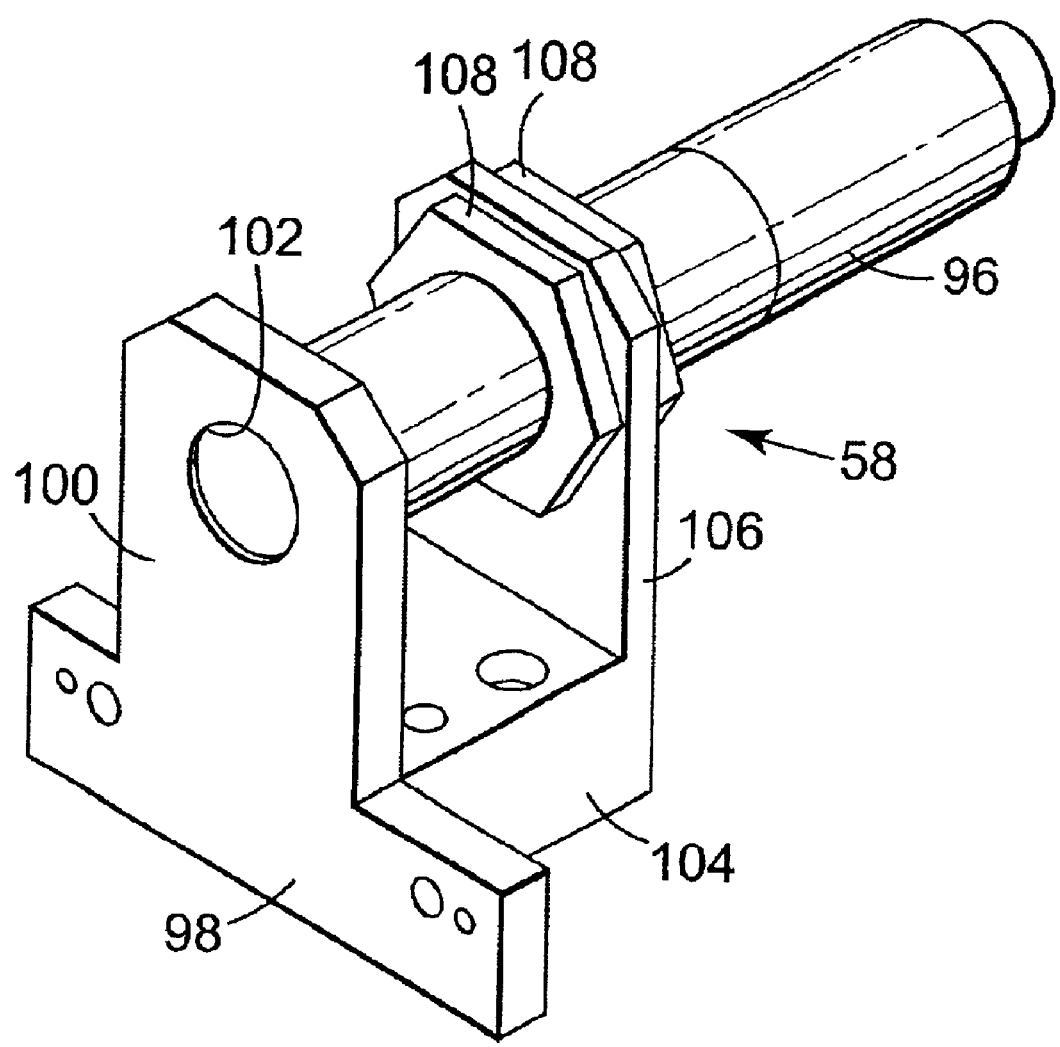
FIG. 4 is a perspective view of an infrared detection device as an example of a temperature monitoring device and its support for monitoring the temperature of a bonding site of catheter components when positioned within the welding assembly of FIG. 2.

As shown in FIG. 4, the bond monitoring device 58, according to one embodiment, preferably comprises an infrared detector (or pyrometer) 96 that is operatively supported to a pyrometer mount 98. The pyrometer mount 98 preferably comprises a first portion 100 having a window 102 to permit viewing of the bonding site 24 when a mount portion 104 is secured in place by conventional fasteners. A second portion 106 of the pyrometer mount 98 also includes a passage (not shown) that permits the pyrometer 96 to be positioned within the passage and to be supported by the second portion 106. As illustrated, threaded nuts 108 act with threads (not shown) provided on an external case of the pyrometer 96 for locking the pyrometer 96 in axial position relative to the window 102 and thus the bonding site 24. The spacing by which the window 102 of the first portion 100 and the pyrometer supporting passage of the second portion 106 are above the mount portion 104 and thus the mounting plate 38 is chosen for a specific application to locate the pyrometer at the necessary plane above the mounting plate 38 for effectively sensing spectral emissivity, and in particular infrared emissions, from the bonding site 24. The pyrometer 96 itself is further connected with an appropriate power source and any other signal controlling mechanisms as are necessary or desirable in accordance with any use of the present invention. Moreover, the pyrometer 96 includes a communication means, whether by wire or wireless technology, so that an electrical signal generated by the pyrometer 96 indicative of its sensed infrared emissivity from the bond site 24 can be transmitted to the RF generator 14 in accordance with a specific aspect of the present invention to provide feedback control of the actual bond site 24. As above, the signal is preferably specifically correlated to the temperature of the polymeric components within the bond site 24.

Figure 5:
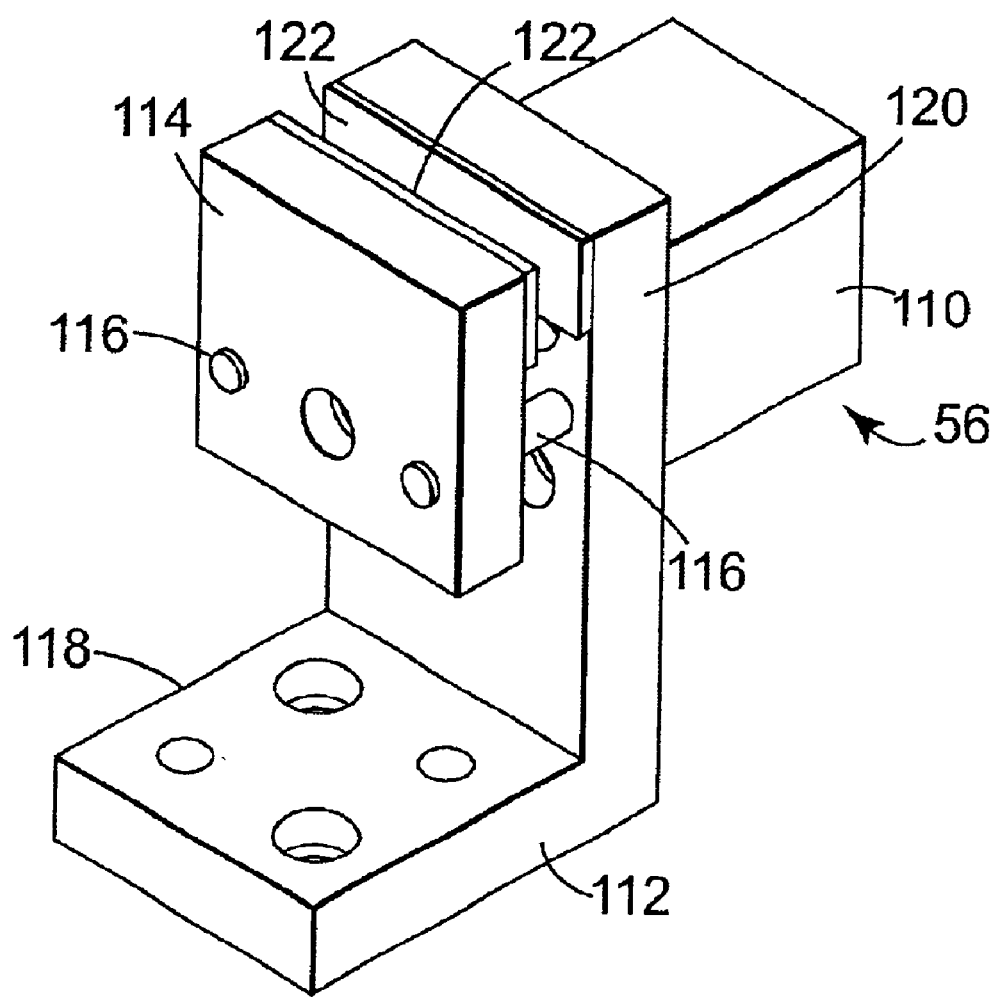
FIG. 5 is a perspective view of a clamp subassembly to be positioned within the welding assembly of FIG. 2 for holding a catheter tube component in position for bonding.

The clamp mechanism 56 is shown in greater detail in FIG. 5 comprising an activation cylinder 10, a mount 112 and a movable jaw 114. The activation cylinder 110 is preferably a pneumatic cylinder, as conventionally known, including at least one and preferably two driven rams 116 that are movable as activated by the pneumatic cylinder in and out of the activation cylinder 110 and that are connected with the jaw 114 so that the jaw 114 moves with them. The mount 112 preferably includes a mount portion 118 having appropriate openings for mounting to the mounting plate 38 by conventional fasteners and a cylinder support portion 120 having passages (not shown) to permit slidable movement of the driven rams 116 and for connecting the activation cylinder 110 to the cylinder support portion 120 by conventional fasteners. As such, the activation cylinder 110 is operatively supported in a position spaced from the mount portion 118 and thus the mounting plate 38 so that the movable jaw 114 can act as a clamp with an upper portion of the cylinder support portion 120 at a position for clamping a catheter component in positioned for bonding at the bond site 24. As noted above and shown in FIGS. 1 and 2, the clamp mechanism 56 and thus it's movable jaw 114 are preferably positioned between the second guide device 52 and the edge 54 of the catheter component support tray 34. Also, it is further preferable that jaw pads 122 be provided at the upper portions of the movable jaw 114 and the cylinder support portion 120 for gripping the catheter component. These jaw pads 122 are preferably comprised of somewhat resilient material, such as natural or synthetic rubbers, including, for example latex rubber, or other materials, such as open or closed cell foams, resilient polymeric materials, and the like for gripping the catheter component without crushing it.

Referring now to FIGS. 6 through 10, the second guide device 52 is described as follows. The second guide device 52 preferably comprises a support block 124 that is molded about a magnetic flux concentrator 126 that is illustrated as a different embodiment from magnetic flux concentrator 26 described above. The support block 124 is preferably molded about the magnetic flux concentrator 126 not only to support it in its operative position, but also to reduce the risk of electrical shock from the coils of an electrical cable 144 if its insulation is stressed or damaged in any way.

Figure 9:
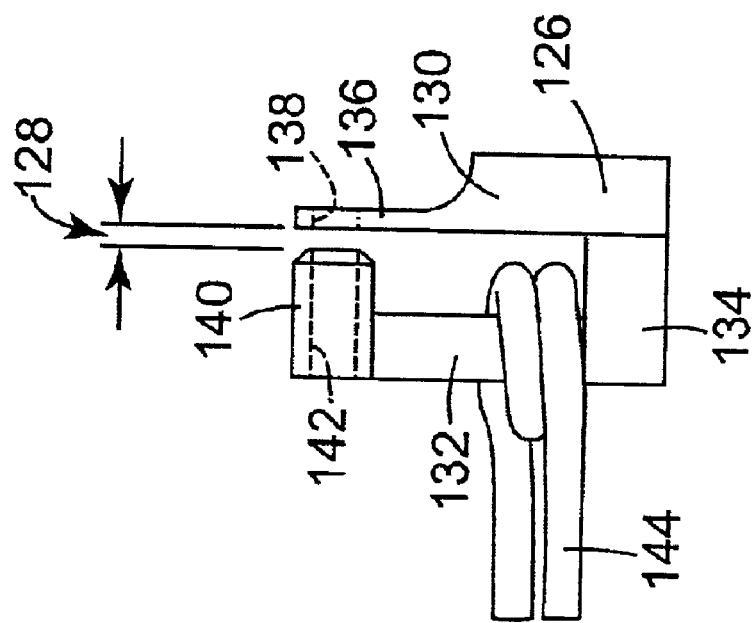
FIG. 9 is a side view of the magnetic flux concentrator of FIG. 8 showing a gap defined by portions thereof within which a bonding site is provided in part.
Figure 8:
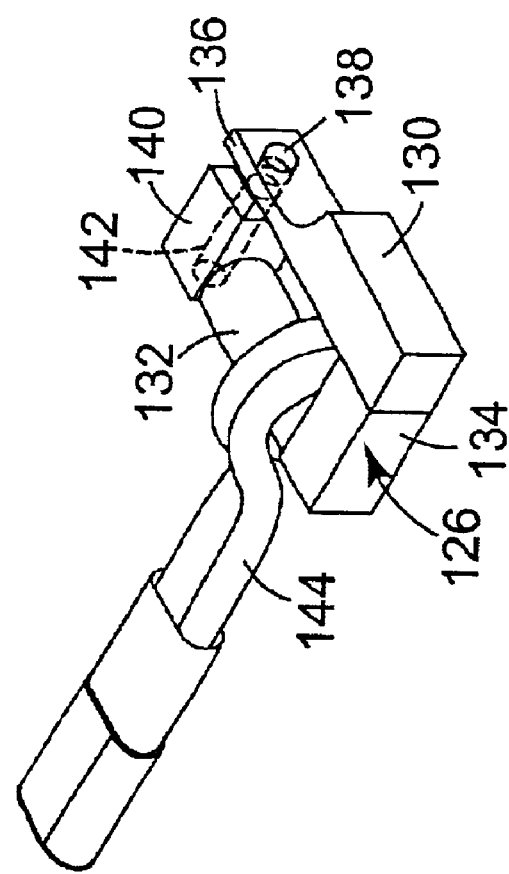
FIG. 8 is a perspective view of a first embodiment of a magnetic flux concentrator in accordance with the present invention as it is combined with an electrical cable that is coiled in position to create a magnetic flux flow path through the magnetic flux concentrator when electrical current is provided through the electrical cable.

As shown in FIGS. 8 and 9, the magnetic flux concentrator 126 according to this preferred embodiment is generally rectangular and defines a central opening. A gap 128, similar to gap 28 described above, is preferably created between a first leg portion 130 and a second leg portion 132 that are connected together by connect portion 134. As above, the gap size is determined based on a specific application, the magnetic field generated and the mandrel design that is to be used. The first leg 130 includes a relatively thinner gap defining portion 136 that is preferably gradually thinned from the remainder of the first leg 130 by a radius portion. The thin gap portion 136 also includes a passage 138 to accommodate insertion of a catheter component and mandrel as will be described in more detail below. Likewise, the second leg 132 includes a gap defining portion 140 having a passage 142 (shown in dashed lines in FIG. 9) that also accommodates insertion of a catheter component and mandrel. The passage 142 is preferably of similar dimension and aligned with the passage 138. The second leg 132 is also preferably rounded along its inside edge to accommodate coiling of the electrical cable 144, which is similar to the cable 30 described above, and which is connected with the RF generator 14. As shown, a plurality of coils are preferably made of the electrical cable 144 around the second leg 132 between its gap defining portion 140 and the connecting portion 134 of the magnetic flux concentrator 126. The gap defining portion 140 of the second leg 132 preferably also extends partially toward the gap defining portion 136 of the first leg 130 so as to define the gap 128 between its end surface, which as illustrated is preferably beveled at its edges, and a side surface of the gap defining portion 136.

The specific design described above and illustrated in FIGS. 8 and 9 has been determined to be particularly beneficial for defining a magnetic flux path and for concentrating its magnetic field within the gap 128 and through passages 142 and 138. That is, in addition to accommodating the other design needs, (such as cable coiling and support needs) the magnetic flux density is optimized within the gap area, as the field strength can be measured within the gap with different design concepts. By such measuring technique, it has been found, for example, that the highest flux density occurs on the face portions of the gap defining portion 140 at the corners thereof for jumping across the gap 128. This design has been found to concentrate its magnetic field so that when a mandrel 20 is positioned through the passages 138 and 142, the mandrel 20 will be effectively heated to provide a controlled weld bond as described above. As noted above, the provision of passages 138 and 142 on the sides of gap 128 act to better concentrate flux around the mandrel 20 from 360 degrees and thus to induce heating substantially evenly about the surface of the mandrel 20.

Figure 6:
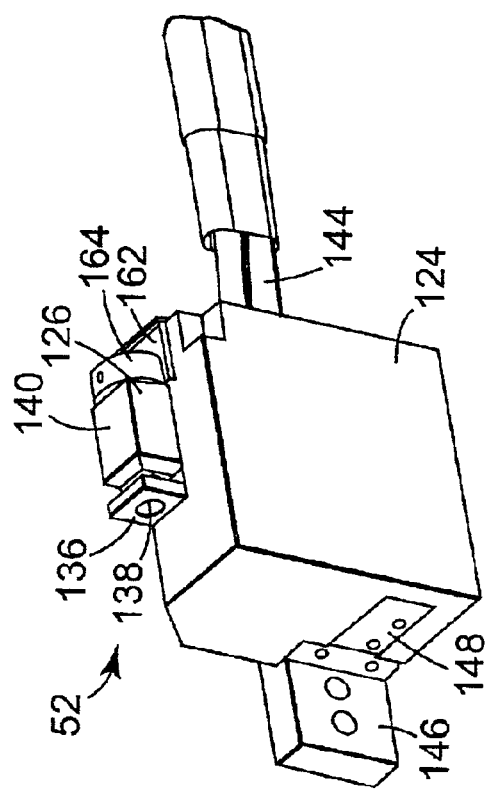
FIG. 6 is a perspective view of a second guide device of the welder assembly of FIG. 2 including a removable second guide insert that is positioned within a guide passage of a magnetic flux concentrator in accordance with the present invention.
Figure 7:
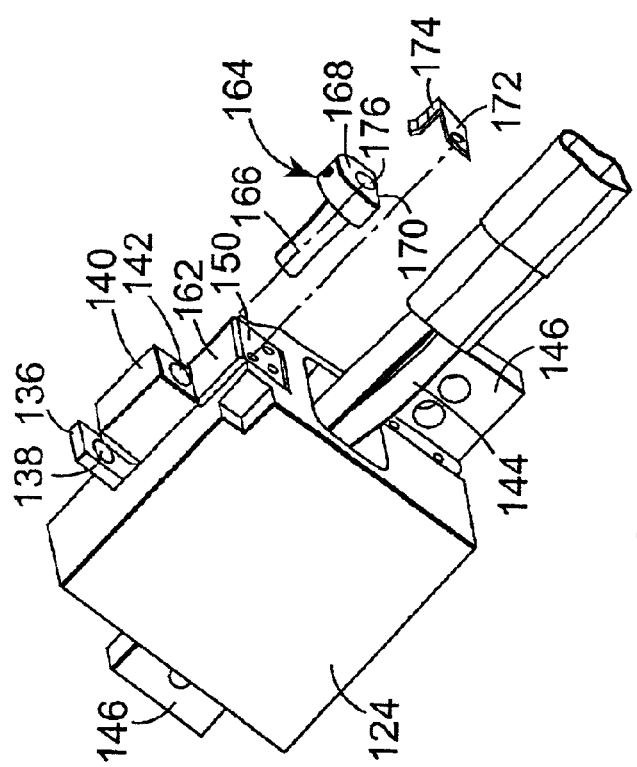
FIG. 7 is a different perspective view of the second guide device shown in FIG. 6 showing the second guide insert and its stop element exploded from the second guide device to illustrate the removal thereof.
Figure 10:
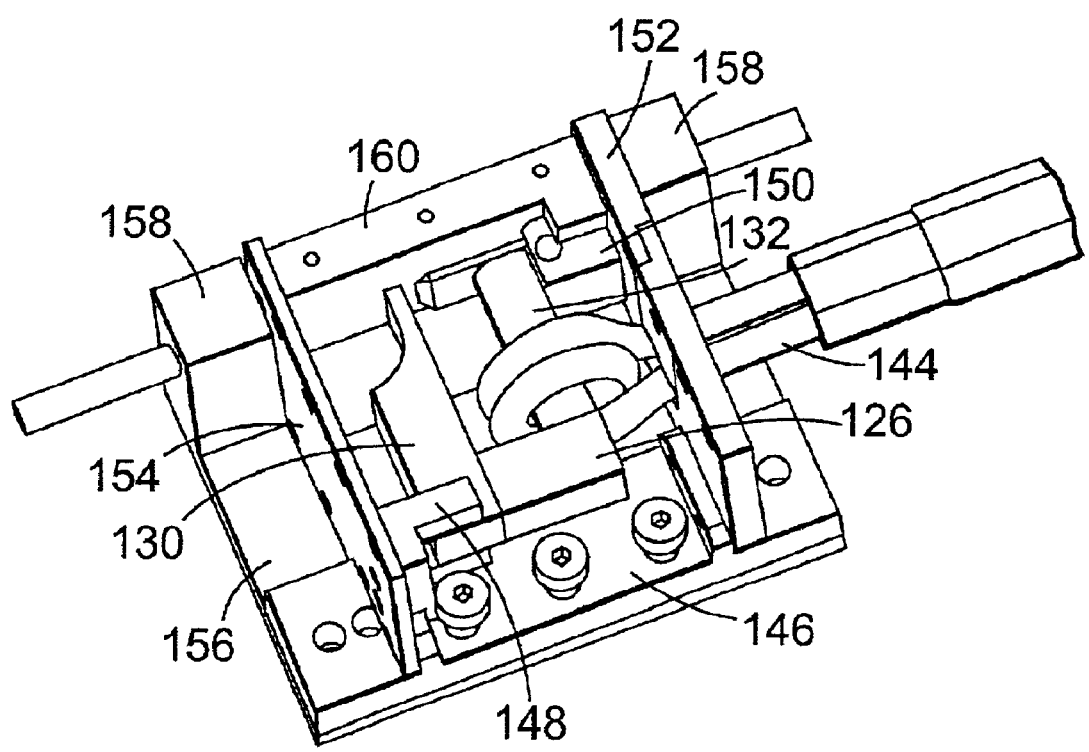
FIG. 10 is a perspective view of a mold assembly for supporting the magnetic flux concentrator of FIGS. 8 and 9 usable for creating the second guide device of FIG. 6.

As illustrated in FIG. 10, the magnetic flux concentrator 126 is preferably connected with a mount 146 by way of a guide element 148 that is positioned to straddle the lower portion of the first leg 130. More specifically, each of these elements as well as a guide support element 150 positioned adjacent to the second leg 132 just below the gap defining portion 140 thereof are preferably connected together or held in place by the support block 124 that is preferably molded about these components as they are positioned appropriately relative to one another. To do this, FIG. 10 further illustrates a first side mold structure 152 positioned along and spaced from the second leg 132 side of the magnetic flux concentrator 126 which mold structure 152 can comprise multiple components as illustrated to accommodate passage of electrical cables 144. Likewise, another side mold structure 154 is positioned along and spaced from the first leg 130 side of the magnetic flux concentrator 126. A back plate 156 with stand features 158 hold the side mold structures 152 and 154 in position and define a backside of the support block 124. The side mold structures 152 and 154 define appropriate sides, respectively, of the support block 124 as well. A top mold element 160 fits between the side mold structures 152 and 154 so as to define a top of the support block 124 that is below the gap defining portion 140 of second leg 132 and part of the gap defining portion 136 of first leg 130. As shown in FIG. 6, the support block 124 is formed with the gap defining portion 140 and the gap defining portion 136 at least sufficiently exposed so that their respective passages 138 and 142 are easily accessible. A front mold plate (not shown) completes the forming of support block 124 as being supported along the side of the top mold 160 and between the side mold structures 152 and 154 as extended to cover the magnetic flux concentrator 126 and the mount 146. When the mold is fully constructed with the magnetic flux concentrator 126, the mount 146, the guide element 148, and the guide support element 150 held in position, fluid material (which may be molten or not) can be poured into the mold from its open bottom side until the mold is filled. After the fluid material is cured or cooled to change to a solid state, each of the mold elements 152,154, 156,160, and the front plate (not shown) are removed to leave a support block 124 as illustrated in FIG. 6 with a portion of the mount 146 extended from the support block 124 to facilitate mounting of the second guide device 52 in addition to the gap defining portions 136 and 140 discussed above. Also, preferably, a top surface 162 of the guide support element 150 is left exposed adjacent to the exposed portion of the gap defining portion 140.

Referring back to FIG. 7, a second guide insert 164 is illustrated that is removably positionable within the passage 142 of the gap defining portion 140 of the magnetic flux concentrator 126. Specifically, the second guide insert 164 and preferably includes a stem portion 166 and a head portion 168, the stem portion 166 sized to be slidably accommodated within the passage 142. The head portion 168 limits the insertion of the second guide insert 164 within the passage 142 and preferably includes a flat surface 170 that is slidably guided by the top surface 162 of the guide support element 150. In order to hold the second guide insert 164 in position within the passage 142, a stop element 172 having a leg portion 174 that abuts against the head portion 168 of the second guide insert 164 when the stop element 172 is secured in position to the guide support element 150. A conventional mechanical fastener can be used to secure the stop element 172 to a perpendicular side of the guide support element 150.

Like the first guide inserts 88 described above, any number of specifically designed second guide inserts 164 can be interchanged with one another. Each second guide insert 164 defines an internal passage 176 that is of a specific size to accommodate a specific need of a particular support application. As discussed in greater detail below, the passage 176 may be defined by the size of the mandrel 20, the size of a catheter component that may be supported thereby, or additional constraining devices that may be utilized as part of the weld bonding process. In any case, it is preferable that the gap defining portion 140 of the magnetic flux concentrator 126 permit any number of second guide inserts 164 to be interchanged with one another, which second guide inserts 164 can be individually tailored for specific applications. To change an insert 164, the stop element 172 is removed so that the second guide insert 164 can be slid from the passage 142 of the gap defining portion 140. Then, another second guide insert 164 can have its stem portion 166 inserted within the passage 142 until the head portion 168 limits the movement, after which the stop element 172 can be reattached in position told the new second guide insert 164 in place.

In accordance with the present invention, it is advantageous in that the first and second guide inserts 88 and 164 can be exchanged in pairs based upon different applications. That is, a number of pairs of first and second guide inserts 88 and 164 can be assembled in kits or the like for use on different applications. Such pairs may include first guide inserts 88 and/or second guide inserts 164 that are the same or different from other pairs. This arrangement thus easily permits the weld bond system 10 to be fitted for any number of different applications simply by exchanging one or both of the first and second guide inserts 88 and 164.

FIG. 11 illustrates an enlarged portion of the weld bond system 10 showing in particular an enlargement of the relationship between the first guide device 50 and the second guide device 52. Specifically, according to a preferred arrangement, the first guide insert 88 is secured in position relative to the guide mount 78 of the first guide device 50 so that a portion thereof extends partially over the support block 124 of the second guide device 52 toward the gap defining portion 136 of the magnetic flux concentrator 126. Also, the internal passage 90 of the first guide element 88 is shown with its axis in line with the axis of passages 138 and 176 of the gap defining portion 136 and the second guide insert 164, respectively. As such, it can be seen that elongate polymeric components and the like can be supported in line with one another for weld bonding.

FIG. 12 is an enlarged portion of that shown in FIG. 11 having a mandrel 20 extending through at least part of the first and second guide inserts 88 and 164 and a first catheter component 178 positioned on the mandrel 20 along with a catheter tip component 180. The catheter component 178 may be of indefinite length and in accordance with the invention described above would be clamped within the clamp mechanism 56 to hold it in position with an end thereof located within the gap 128. The catheter tip component 180 is illustrated as a small definite length component that is to be bonded to the end of the indefinite length catheter component 178. The catheter tip component 180 may be of the same or different material as the catheter component 178 so long as they can be weld bonded as discussed above. The catheter tip component 180 also includes an end surface that meets with the end of the catheter component 178 within the gap 128. Most preferably, the joint 181 formed at the interface of these ends is substantially midway between the facing surfaces of the gap defining portions 136 and 140 within gap 128. In any case, the joint 181 is to be functionally provided within the bonding site 24.

As shown, since the catheter tip component 180 terminates within the passage 138 of the gap defining portion 136 (although such is not necessary), and more particularly since the catheter tip component 180 does not extend at all within the first guide insert 88, the internal passage 90 of the first guide insert 88 is sized only to accommodate the insertion of mandrel 20. The size of passage 138 within the gap defining portion 136 of the magnetic flux concentrator 126 is preferably of sufficient size to accommodate any components that may be usable or that are contemplated to be used for any application of the specific web bond system 10. The internal passage 176 of the second guide insert 164 is shown to be of greater diameter than the external diameter of a tubular catheter component 178. This difference is used in accordance with the illustrated application to accommodate a band 182 of material that may be initially provided about the outside surface portions of the catheter component 178 and the catheter tip component 180 to hold them in place before bonding. Such a band 182 can comprise a shrink material provided as tubing within which at least a part of the catheter component 178 and a part of the catheter tip component 180 are inserted. Such material can then be exposed to heat for shrinking the band 182 against the external surfaces of the catheter component 178 and catheter tip component 180 to hold them together for bonding. After a weld bond is made, the band material may be removed by any conventional means so as to leave the catheter tip component 180 and the catheter component 178 weld bonded together in a permanent manner. Materials usable for the band 182 include rigid or semi-rigid materials that have melting temperatures, and more preferably softening tempertatures above the melting temperature(s) of the components being weld bonded, such as glass, ceramics, metals, and polymers, of which a polytetrafluoroethylene material is preferred.

In accordance with the present invention, and as described in detail above, by generating an RF current from the RF generator 14, magnetic flux flows through the magnetic flux concentrator 126 and at least a portion of the mandrel 20 within the gap 128, which magnetic flux creates electrical current and resistance heating of the mandrel 20. The generated heat is thus controllably transferred to the catheter component 178 and catheter tip component 180 as they are positioned within the gap 128 at a sufficient level so that a weld bond is created in place of the joint 181. As above, it is preferable that the combination of the mandrel 20, the magnetic flux concentrator 126 and its gap 128 create thermal energy that is transferred to the catheter components in a way to first melt and thus bond the surfaces of the joint 181 and then for the bond to progress in both directions away from the joint 181 until an acceptable weld bond is created. For monitoring the advance of the bond site as such is visible, the camera 65 of the camera system system 66 is directed at the gap 128 of the bonding site 24. Moreover, it is contemplated that an indicator plate (not shown) may be provided beneath the bonding site 24 as may be visible to the camera 65. Also, the band 182 may comprise transparent material to permit viewing.

In accordance with the present invention and as also discussed above, the bond monitoring device 58, which preferably comprises an infrared sensing pyrometer 96, is also positioned to receive the spectral emissions from the bonding site 24 as the catheter components are heated. By sensing the infrared emissions, the actual temperature of the polymeric materials, whether molten, softened or solid, at the bonding site 24 can be determined which information can be advantageously used to controllably determined the current generated by the RF generator 14 that in turn creates a controllable magnetic flux flow within the magnetic flux concentrator 126 that in turn creates a controllable resistance heating of the mandrel 20. Thus, the bonding site 24 can be heated by controllably ramping up the heat generated by the mandrel 20 up to a sufficient temperature for creating a weld bond at the joint 181 and then to controllably ramp down the generated heat as the weld progresses to completion. As such, a feedback circuit comprising the infrared pyrometer 96 and the RF generator 14 can effectively create a weld bond without underheating or overheating the bonding site 24.

Figure 14:
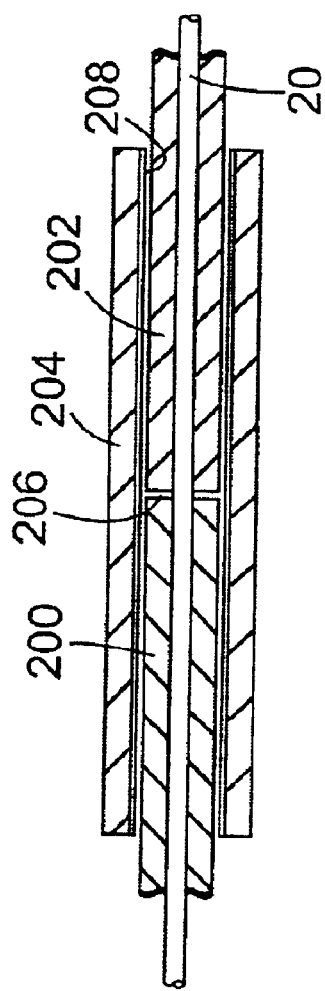
FIG. 14 is a cross-sectional view of an alternative arrangement in accordance with the present invention for catheter tube components as arranged on a mandrel for positioning within a bonding site of the present invention.

FIG. 14 illustrates a manner by which a first catheter component 200, which may be of indefinite length, is combined with a second catheter component 202, which may also be of indefinite length. This type of weld bond is a butt weld similar to that shown in FIG. 12. In this case, however, portions of both of the first and second catheter components 200 and 202 are inserted within a sleeve 204, which sleeve 204 and catheter components 200 and 202 are to be accommodated by the first and second guide inserts 88 and 164, respectively, as positioned as shown in FIG. 12. That is, not only does the passage 176 of the second guide insert 164 need to be sized to accommodate the sleeve 204, the passage 90 of the first guide insert 88 is also to be sized to accommodate the sleeve 204. That way, a joint 206 can be effectively positioned within the bonding site 24 as described above and preferably midway within the gap 128. The sleeve 204, as above, can comprise a shrink band of material or may comprise a more rigid material, such as glass within which the weld bond is created. In order to make it easy to slide the ends of catheter components 200 and 202 within the sleeve 204 and to remove the weld bond after its completion from the sleeve 204, the sleeve 204 preferably comprises an inner sleeve 208 comprising a more lubricious material such as polytetrafluoroethylene.

Figure 15:
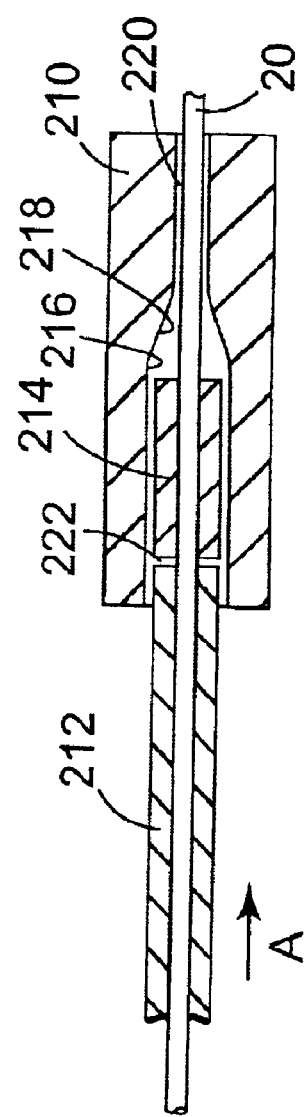
FIG. 15 is a cross-sectional view of yet another alternative arrangement in accordance with the present invention for catheter tube components as arranged on a mandrel for positioning within a bonding site of the present invention.

FIG. 15 illustrates a technique by which components can be weld bonded with one another while a portion of at least one component can be reshaped by a die. Specifically, a first catheter component 212, which is illustrated of indefinite length, is to be bonded to a definite length catheter component 214, such as a tip component, within a passage 216 of the die 210. The die 210 further includes a shaped passage portion 218, the purpose of which is to define a tapered end of the catheter component 214. The die 210 also includes an extended passage 220 coaxial with passage 216 to accommodate the mandrel 20 as it is inserted through the catheter component 212 and the catheter component 214. As above, this arrangement may also be accommodated by appropriately sizing the passages 90 and 176 of the first and second guide inserts 88 and 164, respectively. Moreover, in order to shape the end of catheter component 214 during the weld process, a force may be provided urging both the catheter components 212 and 214 in the direction indicated by arrow A. More specifically, once the bond has progressed from the joint 222 so that the second component 214 is substantially at least softened throughout, movement in the direction A will cause the tip of catheter component 214 to be reshaped by the passage portion 218 of die 210. A requisite force may be provided in any conventional way, such as by driving the clamping mechanism 56 or merely driving the jaw portion thereof in the direction A. Conventional sliding guide mechanisms may be incorporated to do this.

As noted above, the present invention may be utilized to create other weld techniques, such as lap welds and other known or developed welding techniques having at least a portion of more than one component positioned adjacent to a portion of another. Whereas FIGS. 14 and 15 illustrate butt type welds, it can be seen that other weld techniques, like a lap weld, would be similarly set up with component portions positioned adjacent one another. For a lap weld (not illustrated) each component could have an axially extending portion that overlaps that of the other component, which axially extending portions may be sloped or not.

Figure 16:
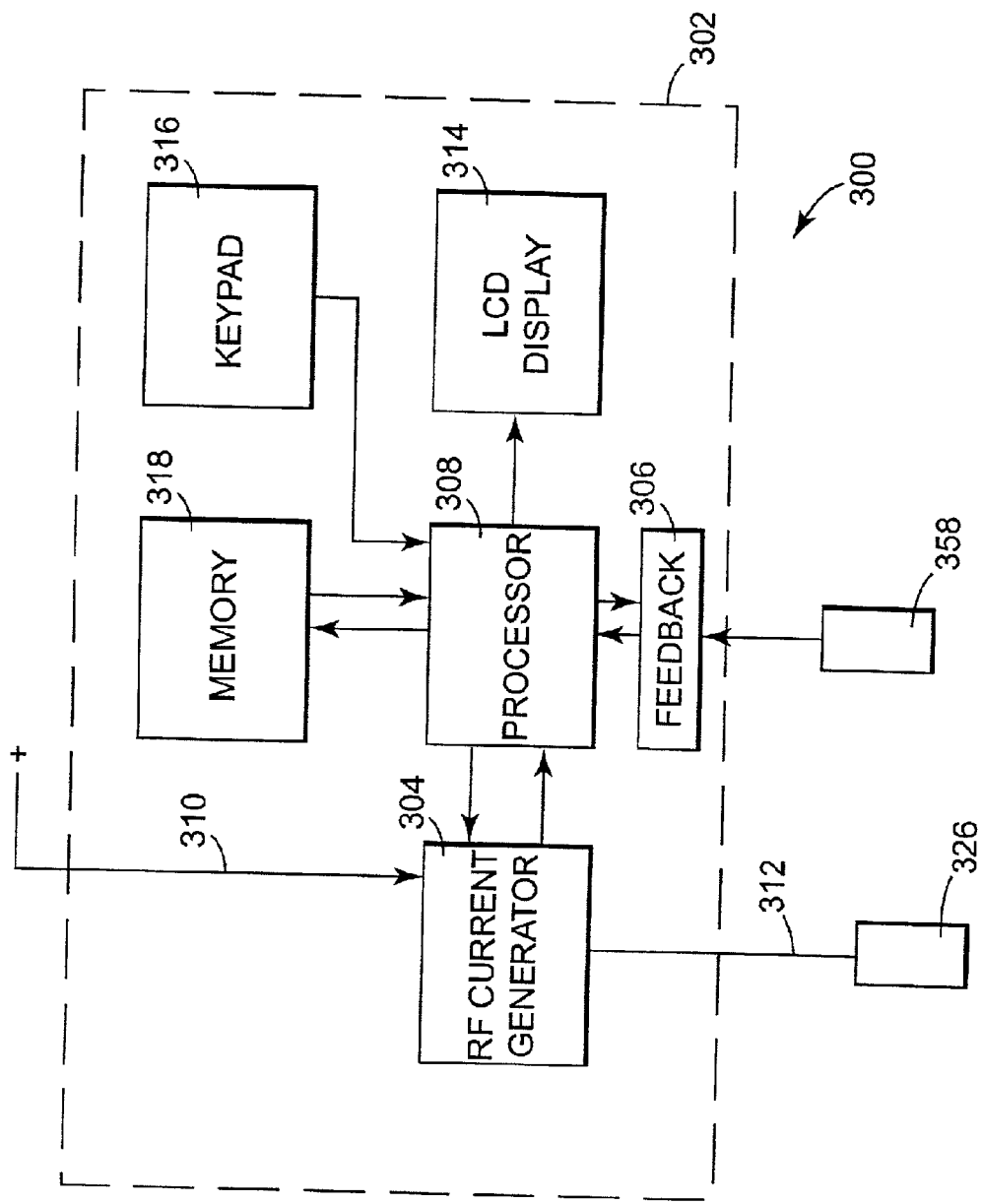
FIG. 16 is schematic block diagram of an RF current generation system including an RF generation circuit and a control feedback circuit combined with a system processor in accordance with an aspect of the present invention for providing RF current output to a magnetic flux concentrator based upon input sensed information obtained from a bond monitoring device.

For generating RF current and monitoring a bond site in order to provide feedback information for controlling the RF current generation, in particular, during a ramp-up of RF current generation to achieve a desired bond site characteristic, such as bond site temperature, and for a controlled dwell period, a system 300 is illustrated in FIG. 16. The feedback control preferably comprises power control logic that, itself, may be accomplished by circuit logic, software, or may be embedded within hardware or any combinations thereof.

Preferably, as illustrated in FIG. 16, such a system 300 may comprise RF generation unit 302 combined with a magnetic flux concentrator 326 as any device that may be provided for utilizing the RF current output from the generation unit 302 and a bond monitoring device 358, as any input device that may be provided for providing usable information to the generation unit 302 for controlling the RF current output. In particular, the RF generation unit 302 is useful for providing controlled RF current output to the magnetic flux concentrator 326, such as those described above at 26 and 126, as part of a weld bonding system. In which case, the input device comprises a bond monitoring device 358, such as an IR sensing pyrometer, that measure IR emmisivity as an indication of bond site temperature, as also described above.

The RF generation unit 302 is schematically illustrated in FIG. 16 as comprising an RF current generation means 304 and feed back control means 306 connected together by a system processor 308. The RF generation means 304 can comprise any known or developed RF generation circuit, such as for converting input power, represented by line 310, to output RF current, represented by line 312. In accordance with the present invention, however, generation of this output RF current 312 can be based upon, at desired times, input information, such as provided by bond monitoring device 358. Preferably, such input information is utilized in the manner as determined by the feedback means 306, which manner can be set by circuit logic, software, embedded logic or combinations thereof. It is understood that where hardware based or circuit logic is utilized, no system processor 308 may be needed. Where software is utilized, it may be loaded within system memory, which may further allow the possibility to customize or program the generation unit 302 based upon different applications.

Also, it is preferable the RF generation unit 302 comprise a display device 314 connected with the system processor 308, which may comprise any conventional or developed display, such as utilizing LCD, LED, or other display technology. A keypad 316, or any other input device, is also preferably connected with the system processor 308 for providing the ability to input desired information, such as bond temperatures, dwell times, current generation ramp-up and frequency information and other application specific information that may be stored within system memory 318.

Other system control circuitry and/or software (whether embedded in hardware or loaded within memory) is also preferably utilized for system operations between the keypad 316, display device 314, memory 318 and system processor 308, and to permit stored input information to be called upon based upon selected applications to control aspects of the RF current generation, such as based upon desired power levels, timing aspects, and the manner by which certain power levels are obtained and maintained in addition to the manner by which such aspects may also be controlled by feedback information. That is, based upon any number of applications, certain control parameters may be set and selected by a user as such parameters may be stored within system memory 318 as preset operations. Alternatively, each application may utilize control parameters specific to that application and that are fully or partially inputted just for the currently desired operation or application. In the case of weld bonding, preset bond operations may be stored within system memory 318, such as based upon component materials, sizes and other characteristics. These operation parameters may include material softening and melt temperatures, dwell times to achieve a desired bond (i.e. to melt a desired quantity of material), and RF current generation control parameters, such as for ramping power up by a controlled gain and bias, as are described below. The RF generation unit 302 may also include circuitry or software to control a cooling operation, such as by activation the cooling system 60, described above, which cooling operation parameters may also be stored or inputted as desired based upon any desired application, including parameters, such as cooling temperatures and/or timing information.

For example, any number of preset RF current generation profiles can be set up in system memory 318 based upon a base operation parameter, such as temperature set point, which itself may be predetermined based upon a number of parameters, such as the materials' melting point and wall thickness and the mandrel's material and size. To permit such information input and storage in system memory 318, it is preferable that an input device, such as the keypad 316, provide access to system processes, preferably by way of a secure process that may require password access and the like, for setting any number of control parameters that are to be associated with one or more preset application profiles. Some or all relevant control parameters may be associated with any given profile, where one or more other control parameters may or may not be required to be input when setting up the system for a given application. Such inputted data for one or more profiles, or any amount of data that may be common to all or any group of profiles can be stored in system memory 318, for example, in data tables in any number of different ways. For each profile, a multi-digit code can be associated so that by user input of such multi-digit code, all relevant parameters can be accessed to run a desired application, which relevant parameters can be stored as a data table associated with that multi-digit code. Such stored data may also include other information that is to be conveyed to the operator upon activation or selection of a preset process profile, which other information may be displayed to the operator upon access to a profile. For example, the operator may be informed of the appropriate guide inserts 88 and 164, the mandrel, or shrink band 182, each of which are described above, to be used for a selected process. Additionally or instead, the data may be tabulated to provide information to the operator including the appropriate profile to be run, such as by displaying a multi-code associated with a profile, based upon a particular material, its melting temperature, and/or a product designation. For example, for a particular identified product, such as a particular catheter, the material composition, size and thickness may be a given, for which an operator may be informed to input a specific application profile and to use requisite guide inserts 88 and 164, shrink band 182, and a particular mandrel (e.g. that may be designated by size and material). For each profile, any number of control parameters can be stored in system memory 318 or otherwise input, including any and all of the control parameters noted in the following RF current control logic description as a preferred manner for power ramp-up, dwell at temperature and cooling.

Figure 17:
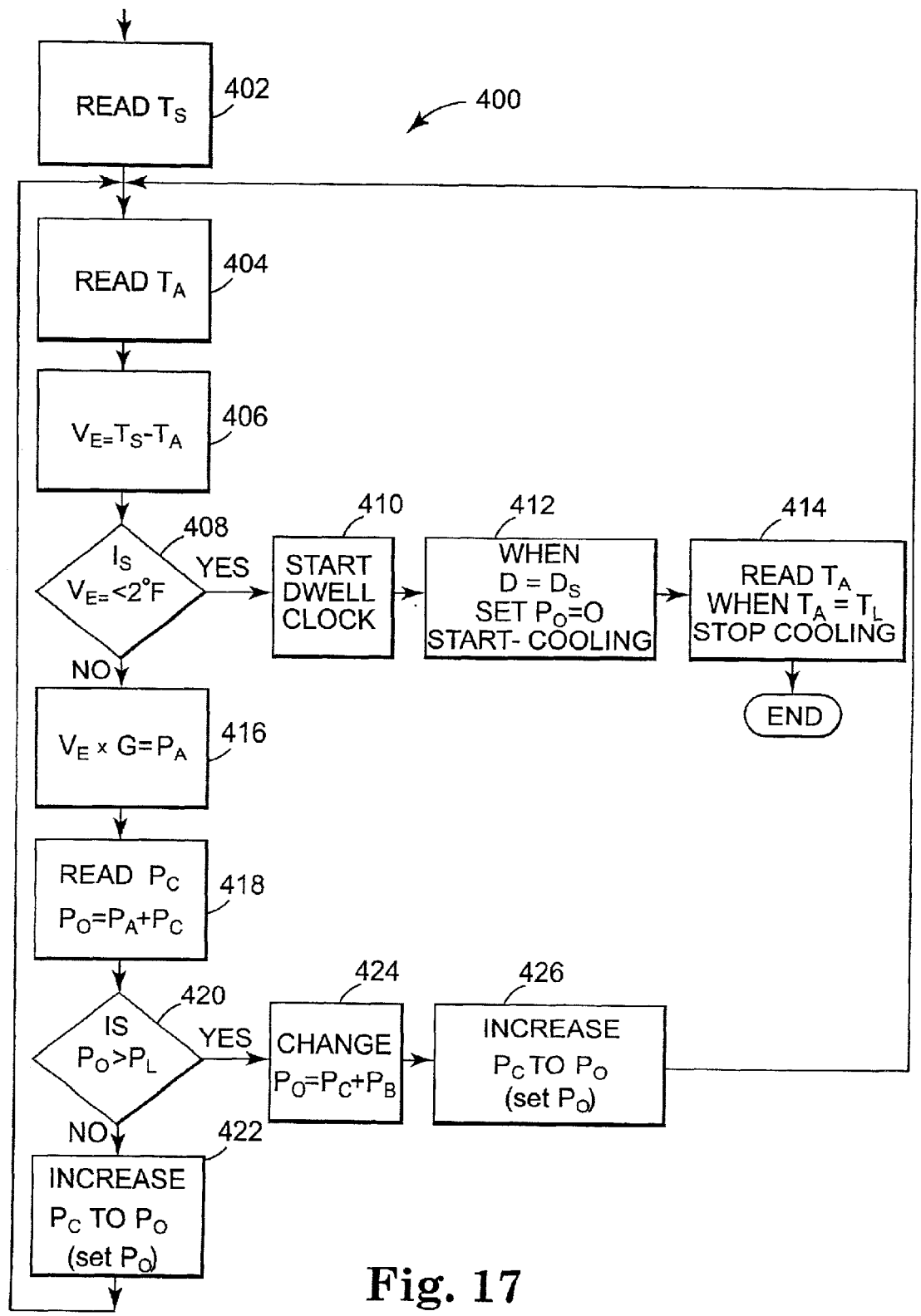
FIG. 17 is a flow chart of a feedback control algorithm in accordance with the present invention.

Referring to FIG. 17, a preferred manner of control logic for power output is set out in a flow chart, which control logic may be accomplished by circuit logic, software, or may be embedded within hardware or any combinations thereof and the like. As an example that is set out in FIG. 16, the power control logic may be performed by the processor 308 based upon its system processes, data stored in system memory 318 or input into memory (or any temporary memory) for the application, and feedback processes based upon sensed information provided by a bond monitoring device 58. By power output, it is meant the strength of the RF current or its power level, as such may be ramped-up, held for a dwell period, and/or reduced. In accordance with the present invention, such power output is controllably determined at least in part based upon a condition or characteristic of the bond site 24 as sensed by a bond monitoring device 58, such as the temperature of polymeric materials at the bond site 24 as sensed by an infrared sensing pyrometer.

In accordance with the flowchart of FIG. 17, a power control circuit 400 is illustrated for determining an output power $P_O$ based upon a comparison of the actual temperature $T_A$ of a bond site 24, or relevant portion thereof, to the set temperature $T_S$ based upon the materials of a specific application. The output power $P_O$ is preferably determined in accordance with an algorithm that provides selectively for either a gross adjustment or a fine adjustment based upon a power gain limit $P_L$. Thus, either a gross adjustment or a fine adjustment is applied to ramp up the output power $P_O$ until the set temperature $T_S$ is sensed within a desired limit as the actual temperature $T_A$ of the bond site 24. If it is determined according to the algorithm that the set temperature $T_S$ has been reached, then a clock function is started for timing a dwell period without changing the output power $P_O$, followed by a reduction in the output power $P_O$ and onset of a cooling process.

In greater detail, the power control circuit 400 comprises an initial step 402 of reading the set temperature $T_S$ that is to be achieved during a weld bonding operation in accordance with the present invention based upon the properties of the materials to be bonded. As discussed above, this set temperature $T_S$ may be stored within system memory 318 as provided as part of a predetermined profile or as input into memory for the current application. From a bond monitoring device 58, such as an infrared pyrometer discussed above, an actual temperature $T_A$ of the bond site 24 can be determined, which actual temperature $T_A$ is read in step 404. Step 406 represents the determination of the temperature error $V_E$ by subtracting the actual sensed temperature $T_A$ of the bond site 24 from the set temperature $T_S$ that has been predetermined and is to be achieved in accordance with the power control circuit 400.

A first decision step 408 compares the temperature error $V_E$ to an acceptable temperature value, illustrated as 2 degrees Fahrenheit in FIG. 17, which acceptable temperature value may be any value that indicates sufficient achievement of the set temperature $T_S$ (i.e. a determination that the set temperature Ts has been effectively achieved). According to the first decision step 408, if the temperature error value $V_E$ is less than the acceptable temperature value, then the set temperature $T_S$ is considered effectively achieved and a clock function begins. Specifically, if it is determined that the temperature error $V_E$ is less than the acceptable temperature value, a dwell clock is started as indicated at step 410 and a dwell time D begins increasing as an indicator of time. When the dwell time D reaches a set dwell time $D_S$, the output power $P_O$ is set to zero and a cooling cycle, if provided for, can be started as set out in step 412. The set dwell time $D_S$ and any relevant cooling conditions may be read as well from system memory 318 either as stored there and based upon a specific profile or as inputted for the current application. Preferably, the actual temperature $T_A$ of the bond site 24 is continuously sensed so that this feedback information can also be utilized to indicate when the bond site 24 is cooled to a lower temperature limit $T_L$ so that the cooling cycle can be stopped, as indicated in step 414. At this point, the desired bond has been achieved by maintaining the bond site 24 at a set temperature $T_S$ for a determined dwell period $D_S$ by maintaining a constant output power $P_O$. Then, by reducing the output power $P_O$ to zero and cooling of the bond site 24, the bonded components may be subsequently removed from the apparatus for any additional processing.

However, during the ramp-up portion of a power generation cycle, the temperature error value $V_E$ will be greater than the acceptable temperature value (of 2 degrees Fahrenheit, for example). As such, the result of the decision step 408 will be NO so that a power gain is to be preferably determined. That is, it is preferable to controllably increase the power output $P_O$ based upon a controlled algorithm that more preferably includes course and fine output power adjustments. In accordance with a preferred aspect of the present invention, a gross power adjustment is determined in step 416 based upon a gain factor G, which itself may be predetermined and read as part of the system process from system memory 318 as inputted as part of a profile or for the specific current application. Such a gain factor G is determined based upon the materials of a specific application and a desire to controllably and evenly ramp up the output power $P_O$ over time and thus the actual temperature $T_A$ of the bond site 24. In any case, a power adjustment value $P_A$ is calculated by multiplying the temperature error value $V_E$ by the gain factor G as such has been predetermined. Then, by reading the current power output $P_C$, before any adjustment, and adding to that the power adjustment value $P_A$, a new output power $P_O$ can be determined, as set out in step 418. As such, a gross adjustment is determined that may be used to controllably and evenly increase the current output power $P_C$.

However, prior to making such a gross adjustment in output power $P_O$, a second decision step 420 provides for the comparison of the power output $P_O$ as determined by the gross adjustment (i.e. the actual current power level $P_C$ as it would be increased by a gross power adjustment value $P_A$) to a power limit $P_L$, above which only fine adjustment of output power $P_O$ is permitted. That is, according to a preselected power limit $P_L$ the output power $P_O$ potential increase changes from a gross adjustment to a fine adjustment so that the actual temperature $T_A$ of the bond site 24 can be achieved with a minimized likelihood of overshooting the set temperature $T_S$. This power limit $P_L$ may also be read from system memory 318 as it may have been provided as part of a profile or as input for the current application. So, if the power output $P_O$ calculated according to the gross adjustment does not exceed the power limit $P_L$, the gross adjustment will be applied. That is, the actual current power output Pc is set to the calculated output power $P_O$, as indicated in step 422, based upon the gross adjustment calculation, the result of which is a controlled, determined and substantially even increase in output power $P_O$ to create a similar increase in bond site 24 temperature $T_A$.

If, on the other hand, it is determined in decision step 420 that the output power $P_O$ as adjusted by the gross adjustment calculation would be over the power limit $P_L$, then the output power $P_O$ is differently determined or recalculated as set out in step 424 based upon the addition of the current output power $P_C$ with a predetermined bias power $P_B$ as part of a controlled fine adjustment of the output power $P_O$ and thus the temperature $T_A$ of the bond site 24. The bias power $P_B$ is preferably a predetermined value representing an incremental effective increase in power that will effectively close the actual temperature $T_A$ of the bond site 24 in on the set temperature Ts to be achieved by increasing the output power $P_O$. The bias power $P_B$ is also preferably read from system memory 318 as it may have also been provided as part of a profile or selectively input for the current application. The bias power $P_B$ may be determined based upon factors including the materials that are bonded, the effectiveness of a power increase as relates to a temperature increase over time and a controlled closing in on the set temperature $T_S$ to be achieved without it being overshot. In accordance with the fine adjust, once the output power $P_O$ has been recalculated, the following step 426 sets the current output power $P_C$ to the recalculated output power $P_O$ so that a fine increase in power is applied for causing a fine temperature $T_A$ increase to the bond site 24.

Whether either a fine adjust or a gross adjust power increase is determined, the current power $P_C$ is reset to a calculated new output power $P_O$ as set out in either step 422 or 426. Then, according to the algorithm of the power control circuit 400, a new sensed temperature $T_A$ is read for the subsequent first decision process of step 408 to see if the achieved actual temperature $T_A$ has effectively attained the set temperature $T_S$ within the aforementioned preferable range of sufficient temperature attainment. If a gross adjust had been previously just applied, the temperature error value $V_E$ should still be greater than or equal to the acceptable temperature achievement limit. Thus, the possibility for a further gross adjustment or a fine adjustment should exist. That is because the power limit $P_L$ should be set preferably to require the application of one or more fine adjust techniques to more slowly close in on the set temperature $T_S$ according to the predetermined application of a bias power $P_B$ increase.

Figure 18:
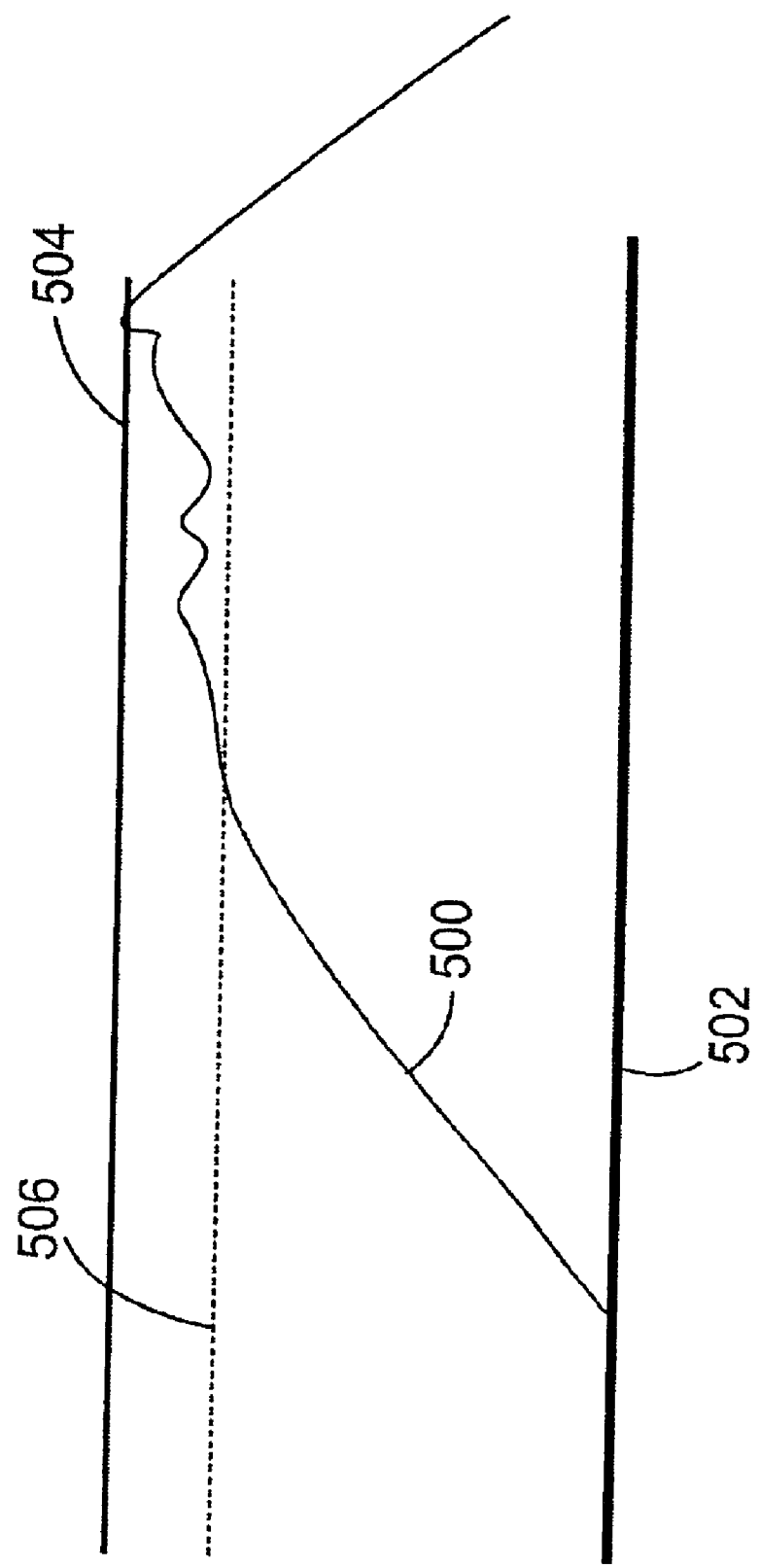
FIG. 18 is a graphical representation of a preferred temperature control profile for utilizing feedback control while ramping RF current generation to obtain a desired bond site temperature for a dwell period in accordance with one version of the present invention.

This preferable manner of ramping the bond site temperature $T_A$ as it is sensed up to the set temperature $T_S$ is illustrated in FIG. 18. A temperature profile of a bond site 24 is indicated by the line 500 as it increases from line 502 that represents ambient temperature toward line 504 that represents the set temperature $T_S$ to be achieved. Dashed line 506 represents the power limit $P_L$ point at which the application of gross adjustments is changed to the application of fine adjustments. As illustrated, line 500 between the ambient temperature line 502 and the power limit $P_L$ line 506 is preferably of substantially even slope indicating a substantially controlled and even increase in temperature $T_A$ of the bond site 24 as the gross adjust techniques are applied for increasing output power PO from the RF generation device 302. But, between the power limit line 506 and the set temperature line 504, line 500, which represents the bond site actual temperature $T_A$ over time, may fluctuate, as illustrated, during the gradual and controlled fine adjust of the output power $P_O$ from the RF generation device 302. Such fine adjust techniques are applied until the set temperature $T_S$ is sufficiently achieved, which as illustrated occurs when the line 500 reaches the set temperature line 504. Lines 500 and 504 converge and generally follow one another for a period representing the dwell time $D_S$ during which the power output $P_O$ is maintained without adjust to create an effective bond at the bond site 24. Then, output power $P_O$ is cut and a cooling operation may be applied until the actual temperature $T_A$ of the bond site 24 decreases to a cool set point, which cooling operation is indicated by the sharp downward portion of line 500 from the set temperature line 504.

As described above, it is contemplated that many different temperature profiles can be achieved in accordance with the present invention based upon the application of the principles of control for the output power of the RF generation device 302 depending on a number of different applications. Moreover, it is clear that any number of different applications may be profiled and stored within system memory 318 or some or all control parameters may be selectively input for any specific application. According to the above examples, any or all of the predetermined values may be provided as part of a profile, including, for example, the set temperature $T_S$, the acceptable temperature range value, the dwell period $D_S$, the gain factor G, the power limit $P_L$, and the bias power $P_B$.

Moreover, in accordance with the present invention, the above examples of increasing output power from the RF generation device 302 may be based upon other determined information than temperature. As above, it is preferable that temperature be determined based upon the sensing of infrared radiation from a bond site 24. It is also contemplated that temperature may be sensed by other means than infrared radiation. Also, instead of determining temperature, any other condition of the bond site 24 can be measured as an indication of creating an effective weld, such as based upon appearance or fluidity of the materials. In any case, the same principles may be applied in effectively controlling and obtaining an effective weld bonding of materials that may be similar or dissimilar.

The present invention is not limited to the above described preferred methods, devices, systems and apparatuses. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. A weld bonding system for creating a weld bond between a first component of polymeric material and at least a second component comprising:
    a first guide device for supporting the first component in position for creating a weld bond;
    a second guide device for supporting the second component in position, and, with said first guide device, providing a bonding site wherein the first and second components, as supported by the first and second guide devices, can be supported to be weld bonded together;
    a current generation means for controllably creating an alternating electrical current, said current generation means operatively connected with an electrical conductive cable for carrying the alternating electrical current that is generated;
    a magnetic flux concentrator of magnetically permeable material that is operatively positioned with respect to the electrical conductive cable so that reversing magnetic flux can be created passing within said magnetic flux concentrator by the alternating electrical current through said electrical conductive cable; and
    a bond monitoring device operatively positioned for detecting a condition of a polymeric component when positioned within said bonding site and for creating a signal based upon the detected condition of the polymeric component within said bonding site, said bond monitoring device being further operatively connected with said current generation means so that the signal can be transmitted to and received by the current generation means for controllable current generation.

2. The weld bonding system of claim 1, further comprising a mandrel for insertion within a tubular first component of polymeric material so that when a first component is supported by said first guide device, the mandrel can also be at least partially supported thereby with a mandrel portion extending within said bonding site.

3. The weld bonding system of claim 2, wherein said magnetic flux concentrator is operatively positioned with respect to said bonding site so that when said mandrel is inserted within a first tubular component, the mandrel portion positioned with said bonding site will be affected by reversing magnetic flux when generated with said magnetic flux concentrator to produce surface heating of said mandrel to be transferred to an inside surface of a tubular first polymeric component for at least softening its polymeric material for weld bonding with a second component.

4. The weld bonding system of claim 3, wherein said current generation means comprises an RF current generation circuit and a feedback circuit by which the signal from the bond monitoring device is utilized for controllable current generation.

5. The weld bonding system of claim 4, wherein said bond monitoring device comprises an emissivity detector for sensing a measurable emission from a polymeric material of a component within said bonding site as an indication of temperature of such polymeric material within said bonding site.

6. The weld bonding system of claim 5, wherein the emissivity detector comprises an infrared detector.

7. The weld bonding system of claim 6, wherein the infrared detector comprises a HgCdTe detector.

8. The weld bonding system of claim 3, wherein said first guide device comprises a first guide insert that is removably supported by a first guide mount, the first guide insert having a insert passage sized to accommodate a tubular first component.

9. The weld bonding system of claim 8, wherein said first guide mount includes a mount passage within which the first guide insert can be removably positioned.

10. The weld bonding system of claim 9, further comprising a plurality of first guide inserts with differently sized insert passages to accommodate different tubular first components.

11. The weld bonding system of claim 9, wherein said second guide device comprises a second guide insert that is removably supported by a second guide mount, the second guide insert having a insert passage sized to accommodate a tubular second component.

12. The weld bonding system of claim 11, wherein said second guide mount includes a mount passage within which the second guide insert can be removably positioned.

13. The weld bonding system of claim 12, further comprising a plurality of second guide inserts with differently sized insert passages to accommodate different tubular second components.

14. The weld bonding system of claim 12, wherein said magnetic flux concentrator comprises a first end portion and a second end portion that are arranged with respect to one another to define a gap between respective end surfaces thereof, and said first end portion comprises a passage through which a portion of a component to be weld bonded can be inserted.

15. The weld bonding system of claim 14, wherein the second end portion also comprises a passage through which a portion of a component to be weld bonded can also be inserted.

16. The weld bonding system of claim 15, wherein the second guide insert is removably supported within the passage of the first end portion of the magnetic flux concentrator as the mount passage thereof.

17. The weld bonding system of claim 16, wherein the first and second end portions of the magnetic flux concentrator are joined together by a continuous magnetically permeable structure that defines an internal opening with at least a portion of the magnetically permeable structure being wrapped by at least one coil of the electrical conductive cable so that alternating electrical current through said coil causes reversing magnetic flux flow within the magnetically permeable structure.

18. The weld bonding system of claim 17, wherein said magnetically permeable structure comprises first and second leg portions spaced from one another and terminating in said first and second end portions, respectively, and said first leg portion being at least partially rounded to accommodate a plurality of coils of said electrical conductive cable wrapped about it.

19. The weld bonding system of claim 1, further comprising a cooling system operatively positioned with respect to said first and second devices so as to controllably provide cooling gas flow directed to said bonding site.

* * * * *

UNITED STATES PATENT AND TRADEMARK OFFICE
CERTIFICATE OF CORRECTION

PATENT NO.    : 6,858,083 B2
DATED         : February 22, 2005
INVENTOR(S)   : Michael W. Sterud et al.

It is certified that error appears in the above-identified patent and that said Letters Patent is hereby corrected as shown below:

<u>Column 26,</u>
Line 20, delete "PO" and insert in place thereof -- $P_O$ --.

Signed and Sealed this

Fifth Day of July, 2005

JON W. DUDAS
*Director of the United States Patent and Trademark Office*